United States Patent
Kimishima et al.

(10) Patent No.: US 11,959,775 B2
(45) Date of Patent: Apr. 16, 2024

(54) INFORMATION PROCESSING DEVICE AND INFORMATION PROCESSING METHOD THAT ENABLE SIMPLE CALIBRATION

(71) Applicant: SONY GROUP CORPORATION, Tokyo (JP)

(72) Inventors: Masato Kimishima, Tokyo (JP); Kosei Yamashita, Tokyo (JP); Toru Amano, Tokyo (JP); Tetsuro Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/799,094

(22) PCT Filed: Feb. 5, 2021

(86) PCT No.: PCT/JP2021/004356
§ 371 (c)(1),
(2) Date: Aug. 11, 2022

(87) PCT Pub. No.: WO2021/166691
PCT Pub. Date: Aug. 26, 2021

(65) Prior Publication Data
US 2023/0081527 A1 Mar. 16, 2023

(30) Foreign Application Priority Data
Feb. 19, 2020 (JP) ................. 2020-026209

(51) Int. Cl.
G01C 25/00 (2006.01)
G06F 3/0346 (2013.01)
G06F 3/0354 (2013.01)

(52) U.S. Cl.
CPC ......... *G01C 25/005* (2013.01); *G06F 3/0346* (2013.01); *G06F 3/03545* (2013.01)

(58) Field of Classification Search
CPC . G01C 25/005; G06F 3/0346; G06F 3/03545; G01P 21/00
See application file for complete search history.

(56) References Cited

U.S. PATENT DOCUMENTS

| | | | |
|---|---|---|---|
| 8,275,544 B1 | 9/2012 | Wells | |
| 2018/0172842 A1* | 6/2018 | Ding | G08G 1/005 |
| 2020/0271689 A1* | 8/2020 | Nichols | G01S 7/497 |

FOREIGN PATENT DOCUMENTS

| | | |
|---|---|---|
| CN | 107421563 A | 12/2017 |
| JP | 2009-133695 A | 6/2009 |

(Continued)

OTHER PUBLICATIONS

International Search Report and Written Opinion of PCT Application No. PCT/JP2021/004356, dated Apr. 27, 2021, 08 pages of ISRWO.

*Primary Examiner* — David D Davis
(74) *Attorney, Agent, or Firm* — CHIP LAW GROUP

(57) ABSTRACT

Provided is an information processing device and an information processing method that enable simple and appropriate calibration. When a pen-type device incorporating an inertial measurement unit such as an IMU is moved and a drawn image corresponding to a track is displayed, calibration is implemented on the basis of a measurement value of the inertial measurement device in one stationary attitude and a latitude and an absolute azimuth of the inertial measurement device at that time when the pen-type device is inserted into a pen stand to be fixed in a predetermined direction.

17 Claims, 29 Drawing Sheets

(56) References Cited

FOREIGN PATENT DOCUMENTS

| JP | 2016-157322 A | 9/2016 | |
|---|---|---|---|
| JP | 2016-530612 A | 9/2016 | |
| WO | WO-2013033753 A1 * | 3/2013 | ........... G01C 25/005 |
| WO | 2018/100198 A1 | 6/2018 | |

* cited by examiner

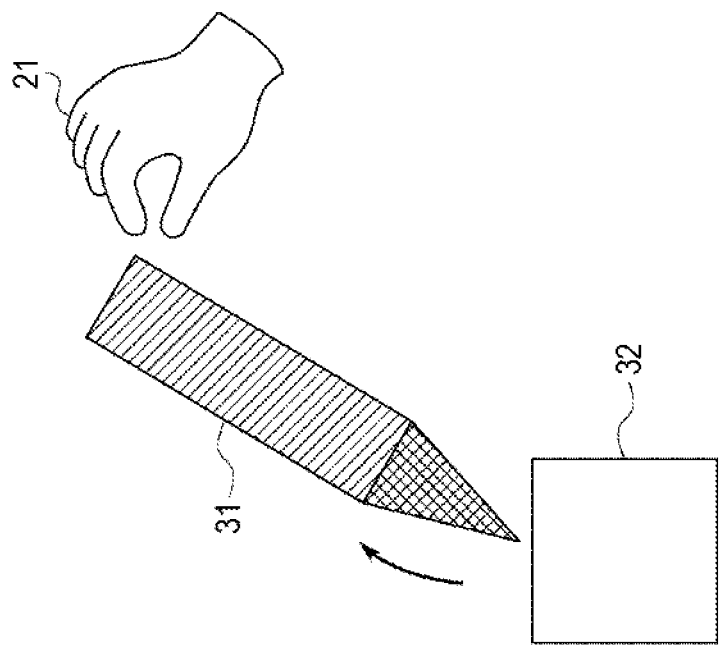
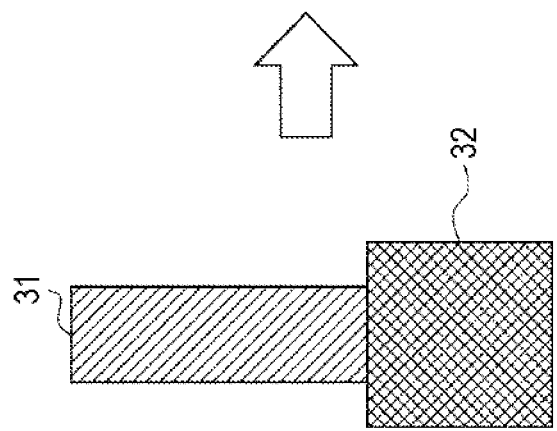
FIG. 7

FIG. 8
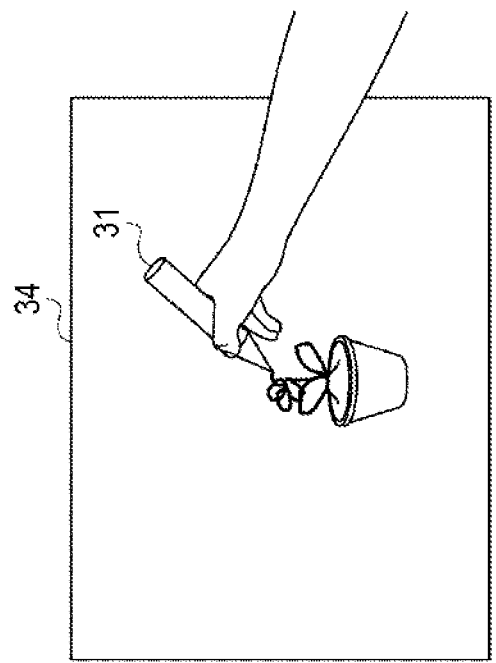
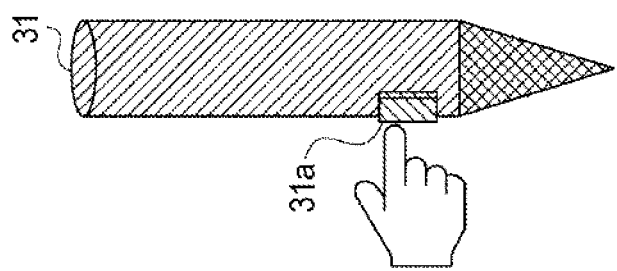

ROTATED 90 DEGREES

INFORMATION PROCESSING DEVICE AND INFORMATION PROCESSING METHOD THAT ENABLE SIMPLE CALIBRATION

CROSS REFERENCE TO RELATED APPLICATIONS

This application is a U.S. National Phase of International Patent Application No. PCT/JP2021/004356 filed on Feb. 5, 2021, which claims priority benefit of Japanese Patent Application No. JP 2020-026209 filed in the Japan Patent Office on Feb. 19, 2020. Each of the above-referenced applications is hereby incorporated herein by reference in its entirety.

TECHNICAL FIELD

The present disclosure relates to an information processing device, and an information processing method, and a program, and more particularly to an information processing device, and an information processing method, and a program that can be appropriately calibrated with a simple operation.

BACKGROUND ART

There is a drawing technique that uses a touch pen provided with a pressure sensor to draw an image on a display unit of a tablet as drawn with the touch pen in contact with a display surface of the tablet, or the like.

In such a case, it is necessary to calibrate the pressure sensor of the touch pen at predetermined intervals.

Accordingly, there has been proposed a technology for calibrating the pressure sensor with such a configuration that a predetermined force acts on the pressure sensor at a tip of the pen when the touch pen is placed upright on a predetermined pen stand (see Patent Document 1).

CITATION LIST

Patent Document

Patent Document 1: Japanese Patent Application Laid-Open No. 2016-157322

SUMMARY OF THE INVENTION

Problems to be Solved by the Invention

Incidentally, in the above-described drawing technique, drawing is achieved by the touch pen coming into contact with the tablet, but for example, it is considered that a gyro sensor is provided in place of the pressure sensor in the touch pen, so that drawing can be performed in accordance with movement of a tip portion in a non-contact state with the tablet.

In this case, it is conceivable to perform calibration using angular velocity when the pen is placed upright on a predetermined pen stand, but the calibration cannot be appropriately performed only with the angular velocity obtained in one type of stationary attitude because an autorotation component and a bias component of the earth are included.

In order to implement the calibration using the angular velocity, the calibration cannot be appropriately performed unless the angular velocities obtained in at least two different types of stationary attitudes are used, and the user needs to place the pen so as to take at least two types of stationary attitudes. Thus, an operation related to the calibration becomes troublesome.

The present disclosure has been made in view of such a situation, and particularly enables appropriate calibration with a simple operation.

Solutions to Problems

An information processing device and a program according to one aspect of the present disclosure are an information processing device including a control unit that calibrates an inertial measurement unit on the basis of a stationary attitude measurement value that is a measurement value detected by the inertial measurement unit and information related to an arrangement of the inertial measurement unit in one stationary attitude, and a program.

An information processing method according to one aspect of the present disclosure is an information processing method including calibrating an inertial measurement unit on the basis of a stationary attitude measurement value that is a measurement value detected by the inertial measurement unit and information related to an arrangement of the inertial measurement unit in one stationary attitude.

In one aspect of the present disclosure, an inertial measurement unit is calibrated on the basis of a stationary attitude measurement value that is a measurement value detected by the inertial measurement unit and information related to an arrangement of the inertial measurement unit in one stationary attitude.

BRIEF DESCRIPTION OF DRAWINGS

FIG. 7 is a view describing an outline of an operation of the pen drawing system.

FIG. 8 is a view describing an outline of an operation of the pen drawing system.

MODE FOR CARRYING OUT THE INVENTION

Figure 1:
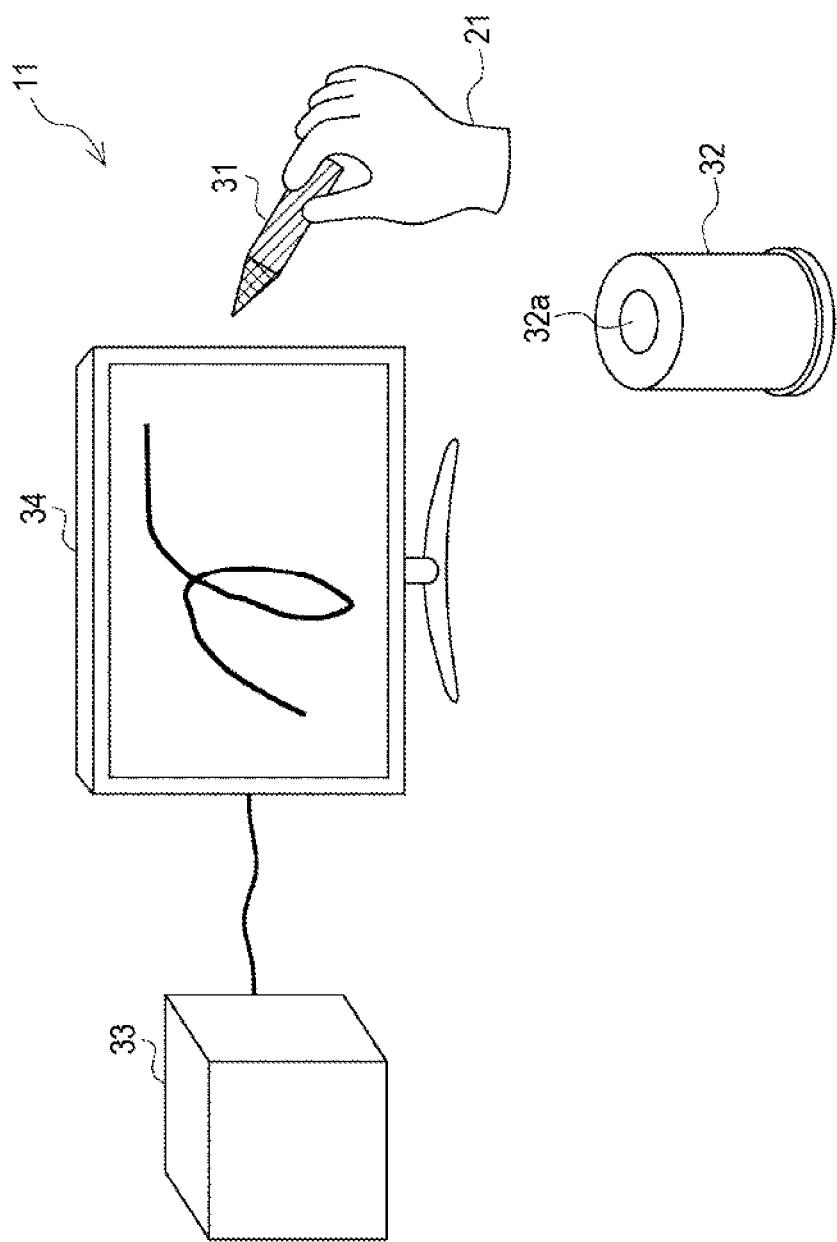
FIG. 1 is a view describing a configuration example of a pen drawing system to which the technology of the present disclosure is applied.

Hereinafter, preferred embodiments of the present disclosure will be described in detail with reference to the accompanying drawings. Note that in the description and the drawings, components having substantially the same functional configuration are denoted by the same reference numerals, and redundant descriptions are omitted.

Hereinafter, a mode for carrying out the present technology will be described. The description will be made in the following order.

1. Preferred embodiment
2. Application example
3. Example of execution by software 1. Preferred Embodiment <Pen-Type Drawing System>

In particular, the present disclosure enables appropriate calibration with a simple operation.

FIG. 1 is a view describing an external configuration of a pen drawing system to which the technology of the present disclosure is applied.

The pen drawing system 11 in FIG. 1 includes a pen 31, a pen stand 32, a personal computer (PC) 33, and a display device 34.

When the pen 31 is held by a user 21 and the user 21 moves its tip so as to correspond to a shape desired to be drawn, corresponding information of a track of the tip is detected and transmitted to the PC 33 by communication such as Wi-Fi.

More specifically, the pen 31 includes an inertial measurement unit (IMU) including an acceleration sensor and a gyro sensor, obtains a track of the position of the tip when moved by the user 21 by inertial navigation, and transmits the track to the PC 33.

The PC 33 generates a drawn image in which the track corresponding to movement of the tip of the pen 31 is drawn on the basis of the information of the track of the tip of the pen 31 transmitted from the pen 31, and causes the display device 34 including a liquid crystal display (LCD), an organic electroluminescence (EL), or the like to display the drawn image.

The pen stand 32 is formed by a transparent acrylic plate or the like, is provided with a hole 32a having substantially the same shape as the tip of the pen 31, and is configured such that the tip of the pen 31 is inserted into the hole 32a to place the pen 31 upright.

Furthermore, the pen stand 32 and the pen 31 are configured such that a mutual positional relationship does not change, and the pen 31 is configured such that an absolute azimuth on the earth becomes a constant azimuth when being placed upright on the pen stand 32.

With such a configuration, the pen 31 can obtain the autorotation component by acquiring the absolute azimuth and the latitude, so that the calibration can be implemented by specifying the bias component on the basis of the angular velocity detected in one kind of stationary attitude of being placed upright on the pen stand 32.

Thus, in the pen drawing system 11 of FIG. 1, the user 21 takes out the pen 31 from the pen stand 32 and moves the tip so as to draw a shape desired to be drawn, so that the display device 34 can display a desired shape as a drawn image.

At this time, the pen 31 can take one kind of stationary attitude by a simple operation of placing upright on the pen stand 32, and the incorporated IMU can be appropriately calibrated.

Note that, although FIG. 1 describes an example in which a drawn image corresponding to a drawing operation of the pen 31 is displayed on the display device 34, any other configuration may be used as long as it is capable of performing the display, and for example, a head mounted display (HMD) or the like may be used.

<External Configuration Example of Pen and Pen Stand>

Figure 2:
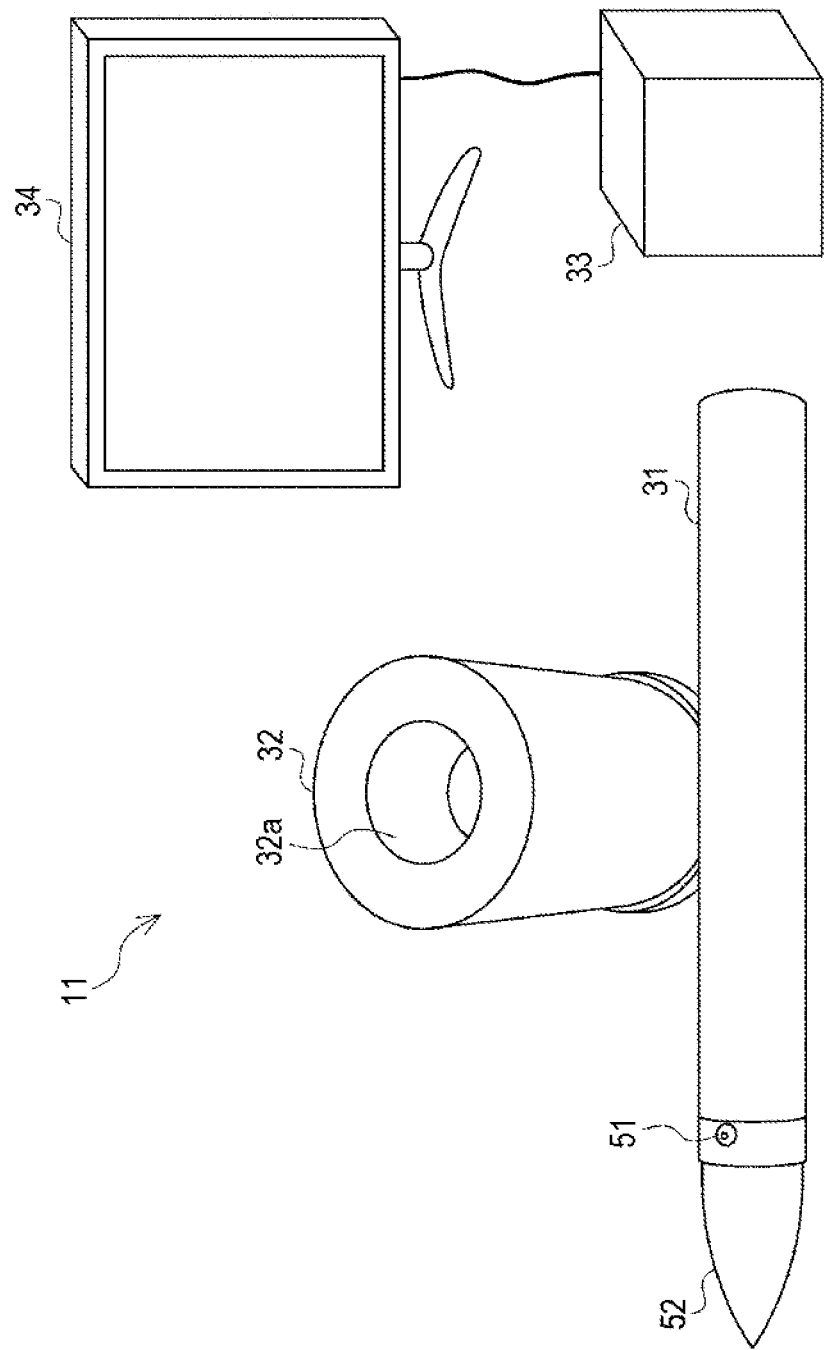
FIG. 2 is a view describing a detailed external configuration example of a pen and a pen stand.

FIG. 2 illustrates an external configuration example of the pen 31 and the pen stand 32.

The pen 31 includes a pressure-sensitive sensor 51 and a light emitting unit 52.

The pressure-sensitive sensor 51 is a button pressed by the user 21 when the user tries to draw on the display device 34 by operating the button so that the position of the tip changes in the held state.

That is, when the pressure-sensitive sensor 51 is in a pressed state, the information of the track of the tip of the pen 31 is detected by inertial navigation and transmitted to the PC 33.

At this time, the PC 33 causes the display device 34 to display the drawn image along with movement of the tip of the pen 31 on the basis of the information of the track transmitted from the pen 31.

The light emitting unit 52 emits light when the pen 31 is placed upright on the pen stand 32 and the calibration is completed, turns off when an elapsed time from when the pen 31 is taken out of the pen stand 32 and the drawing operation is performed exceeds a predetermined time, and emits light when the pen is placed upright on the pen stand 32 again and the calibration is completed.

Thereafter, an operation in which the pen 31 is taken out of the pen stand 32 by the user 21, the pressure-sensitive sensor 51 is pressed, and the tip of the pen 31 is moved so as to draw a shape desired to be drawn by the user 21 is referred to as a drawing operation.

Therefore, when the drawing operation is performed, the pen 31 detects the information of the track of the tip by inertial navigation and transmits the information to the PC 33, and the PC 33 causes the display device 34 to display the drawn image corresponding to the track drawn along with the movement of the tip of the pen 31 on the basis of the transmitted information of the track.

Figure 3:
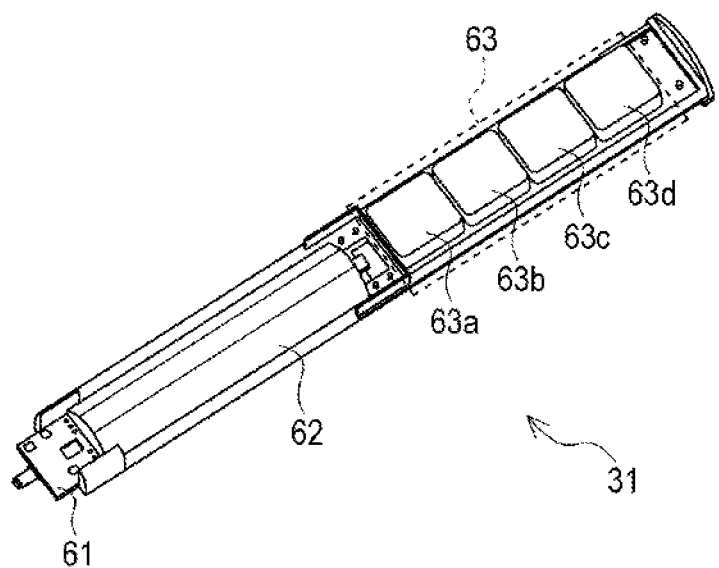
FIG. 3 is a view describing a detailed configuration example of the pen.

Furthermore, as illustrated in FIG. 3, the pen 31 includes a circuit board 61 constituting various control units including the pressure-sensitive sensor 51 and the light emitting unit 52, a battery 62 that supplies drive power of the pen 31, and a multi-IMU 63 including IMUs 63a to 63d.

The pressure-sensitive sensor 51, the light emitting unit 52, and the multi-IMU 63 are provided on the circuit board 61, and operations thereof are further controlled by a control unit 101 (FIG. 10) provided on the circuit board 61.

The multi-IMU 63 includes a plurality of IMUs 63a to 63d, detects position information on the basis of an angular velocity and an acceleration obtained by inertial navigation by each of the IMUs 63a to 63d, and outputs the position information to the control unit 101.

Note that the multi-IMU 63 includes the four IMUs 63a to 63d for the purpose of improving detection accuracy, but may be of any number as long as the number is two or more, and may be configured by one IMU instead of the multi-IMU 63 if a decrease in detection accuracy is allowed.

Figure 4:
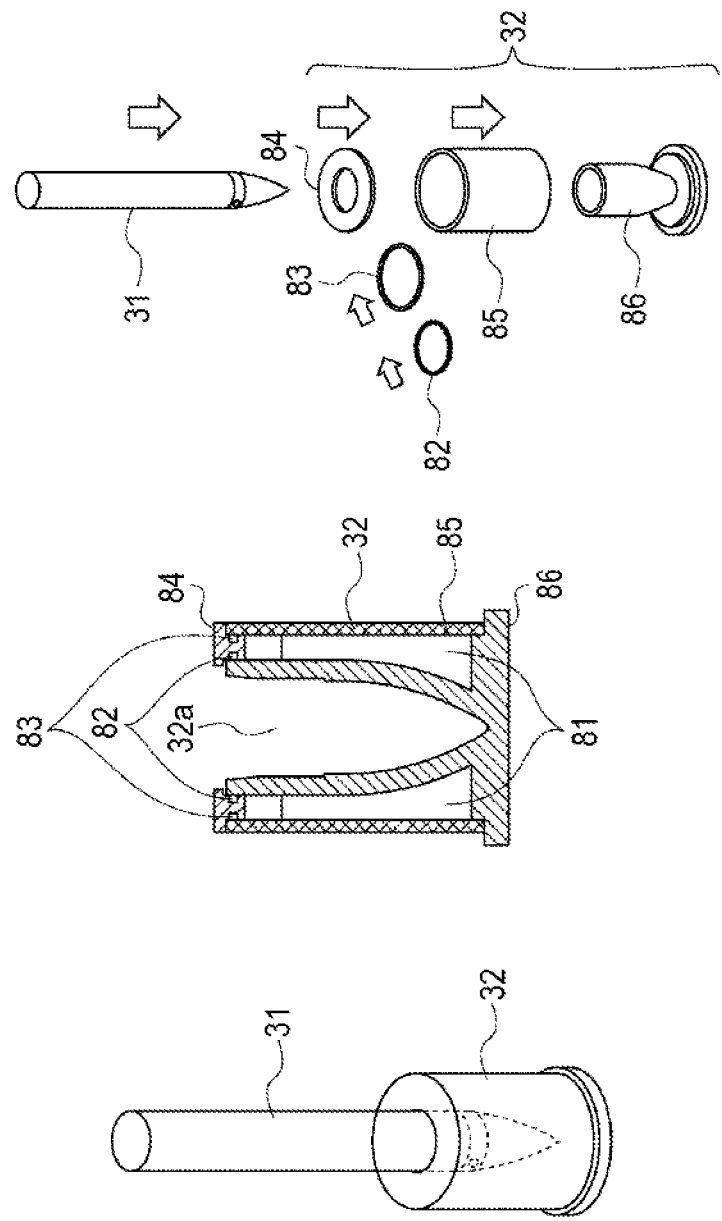
FIG. 4 is a view describing a detailed configuration example of the pen stand.

As illustrated in FIG. 4, the pen stand 32 is formed by clear acrylic resin, and includes an inner diameter part 86 forming a hole 32a having substantially the same shape as the tip of the pen 31, an outer peripheral part 85, and a cover 84.

As illustrated in the center part of FIG. 4, the outer peripheral part 85 is fixed by fitting a bottom portion onto a step portion of a bottom portion of the inner diameter part 86 and fitting an upper portion with the cover 84 via the O-rings 82 and 83.

Furthermore, a hollow portion is formed between the inner diameter part 86 and the outer peripheral part 85, and is filled with a colored liquid 81 having transparency capable of transmitting light.

With such a configuration, the pen can be placed upright on the pen stand 32 by inserting the tip of the pen 31 into the hole 32a.

Furthermore, since the liquid 81 is in a state of being filled by the inner diameter part 86 formed by clear acrylic resin, the outer peripheral part 85, and the cover 84, the light emitted by the light emitting unit 52 at the tip of the pen 31 causes the liquid 81 to emit light, so that the user can visually recognize the light emitting state of the light emitting unit 52 even in a state where the pen 31 is placed upright on the pen stand 32.

Figure 5:
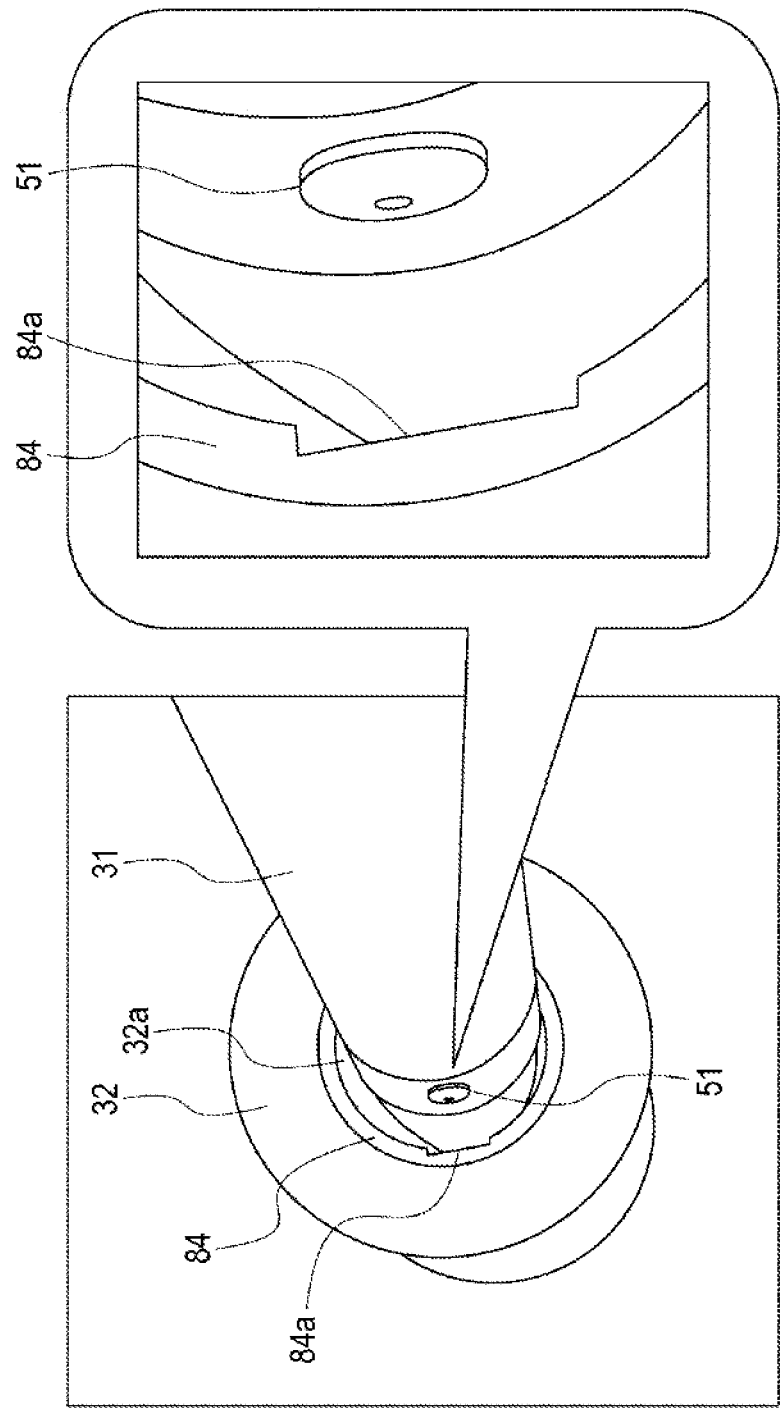
FIG. 5 is a view describing a configuration example of a recess in a cover of the pen stand.

Moreover, as illustrated in FIG. 5, a recess 84a having a shape corresponding to the pressure-sensitive sensor 51 having a protruding shape is formed in the cover 84 constituting an outer shape of the hole 32a, and in a case where it is placed upright by inserting the tip into the hole 32a, the pen 31 cannot be placed upright unless the pressure-sensitive sensor 51 having the protruding shape and the recess 84a are at positions to be fitted facing each other.

With such a configuration, the pen 31 is always placed upright with respect to the pen stand 32 in a state where a specific positional relationship is maintained.

Note that the description will proceed on the assumption that the pen stand 32 is not moved or rotated after being placed upright once. Thus, when being placed upright on the pen stand 32, it is assumed that the pen 31 is always placed upright in the same absolute azimuth.

<Outline of Operation of Pen Drawing System>

Next, an outline of an operation of the pen drawing system 11 of FIG. 1 will be described with reference to FIGS. 6 to 8.

Figure 6:
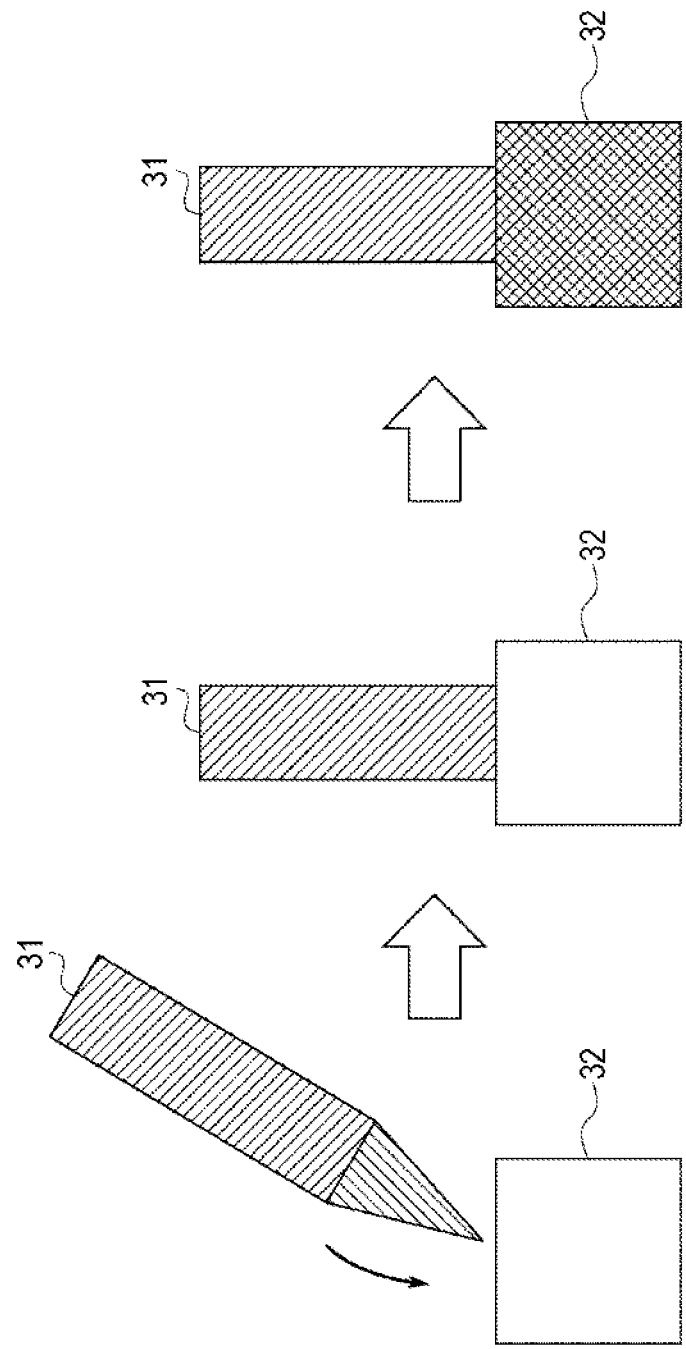
FIG. 6 is a view describing an outline of an operation of the pen drawing system.

First, in order to perform the initial calibration of the pen 31, the tip of the pen 31 is inserted into the hole 32a of the pen stand 32 and placed upright as illustrated in the left part and the center part of FIG. 6.

Note that, hereinafter, unless otherwise specified, the case where the pen 31 is placed upright on the pen stand 32 refers to a state where the tip of the pen 31 is inserted into the hole 32a of the pen stand 32 in a fitted state in a state where the pressure-sensitive sensor 51 having the protruding shape of the pen 31 and the recess 84a provided in the cover 84 face each other as described above.

Here, the pen 31 calculates the autorotation component included in the angular velocity detected by the multi-IMU 63 by acquiring the information of the position information (latitude) and the absolute azimuth on the earth, obtains the bias component on the basis of the autorotation component, and executes the calibration.

When the calibration is completed, as illustrated in the right part of FIG. 6, the pen 31 controls the light emitting unit 52 at the tip to emit light so as to indicate completion of the calibration. Accompanying this, in the pen stand 32, since the inner diameter part 86, the outer peripheral part 85, and the cover 84 are formed by clear acrylic resin, and the hollow portion between the inner diameter part 86 and the outer peripheral part 85 is filled with the colored liquid 81, by the light emitting unit 52 at the tip of the pen 31 emitting light, it is visually recognized as if the entire pen stand 32 emits light.

The user 21 recognizes the completion of the calibration by visually recognizing that the light emitting unit 52 at the tip of the pen 31 is emitting light through the pen stand 32.

Next, as illustrated in the left part of FIG. 7 (the same as the right part of FIG. 6), when completion of the calibration is recognized by the change in color of the tip of the pen 31 via the pen stand 32, the user 21 pulls out the pen 31 from the pen stand 32 at a timing at which the user wants to draw as illustrated in the right part of FIG. 7.

As illustrated in the right part of FIG. 7, the user 21 pulls out the pen 31 and, as illustrated in the left part of FIG. 8, moves the tip so as to draw a track of a desired shape while pressing the pressure-sensitive sensor 51 provided on a side surface part of the pen 31.

Then, when the drawing button 31a is pressed, the pen 31 recognizes that the user 21 has an intent to draw, obtains the track (displacement of position information) along with movement of the tip of the pen 31 by inertial navigation, and transmits the track to the PC 33 as track information of the tip of the pen 31.

On the basis of the track information indicating the displacement of the position information of the tip of the pen 31 transmitted from the pen 31, for example, the PC 33 generates a drawn image as if it is drawn with the pen along with the movement of the tip of the pen 31, and causes the display device 33 to display the drawn image as illustrated in the right part of FIG. 8.

Note that errors are accumulated in the information of the position of the tip obtained by the IMU along with the elapsed time since when the pen 31 is pulled out from the pen stand 32. For this reason, when an elapsed time after being pulled out from the pen stand 32 exceeds a predetermined time (10 seconds regularity), and an error larger than a predetermined error is accumulated and the calibration becomes necessary, the pen 31 turns off the light emitting unit 52 at the tip.

When the user recognizes that the calibration is necessary by the light emitting unit 52 at the tip of the pen 31 turned off in this manner, the user inserts the pen 31 into the hole 32a of the pen stand 32 to place the pen 31 upright as illustrated in FIG. 6.

By repeating this series of operations, while calibrating the error of the IMU of the pen 31, the user 21 pulls out the pen 31 from the pen stand 32 when the calibration is completed, moves the tip so as to trace a desired shape while pressing the pressure-sensitive sensor 51, and thus can have the drawn image for drawing the desired shape displayed on the display device 34.

Furthermore, at the time of the calibration, since the pen 31 can obtain the autorotation component by acquiring its own position information (latitude) on the earth and the information of the absolute attitude when being placed upright on the pen stand 32, the calibration can be implemented only by taking one stationary attitude in which the pen 31 is placed upright on the pen stand 32 in order to obtain the bias component.

Consequently, when using the pen 31, the user can cause the pen 31 to take one kind of stationary attitude necessary for the calibration only by performing an operation of placing the pen upright on the pen stand 32, so that easy and highly accurate calibration can be implemented.

<Overall Processing>

Next, the overall operation of the pen drawing system 11 of FIG. 1 will be described with reference to a flowchart of FIG. 9.

In step S11, the pen 31 determines whether or not an ON/OFF button, which is not illustrated, has been operated and the power has been turned on.

In a case where it is determined in step S11 that the power is not turned on, similar processing is repeated.

In a case where it is assumed in step S11 that the power is turned on, the processing proceeds to step S12.

In step S12, the pen 31 determines whether or not it is in a state of being placed upright on the pen stand 32, that is, whether or not drawing has been performed on the basis of the presence or absence of its own movement.

In a case where it is determined in step S12 that there is no movement of the pen 31 and the pen 31 is in a state of being placed upright on the pen stand 32, the processing proceeds to step S13.

In step S13, the pen 31 executes calibration processing and calculates the autorotation component and the bias component necessary for correction of the multi-IMU 63.

In step S14, the pen 31 causes the light emitting unit 52 to emit light to indicate that the calibration has been completed.

In step S15, on the basis of whether or not the pen 31 moves and is taken out of the pen stand 32, and the pressure-sensitive sensor 51 is pressed, it is determined whether or not the user 21 has instructed to draw a track corresponding to the movement of the tip of the pen 31.

In a case where it is determined in step S15 that drawing has not been instructed, similar processing is repeated.

Then, in a case where it is determined in step S15 that the pen moves and is taken out of the pen stand 32 and the pressure-sensitive sensor 51 is pressed, and the user 21 has instructed to draw the track corresponding to the movement of the tip of the pen 31, the processing proceeds to step S16.

In step S16, the pen 31 corrects an attitude rotation matrix on the basis of the autorotation component and the bias component, converts an acceleration in the sensor coordinate system into an acceleration in the global coordinate system in time series on the basis of the corrected attitude rotation matrix and sequentially adds the acceleration to thereby output position information in the global coordinate system, which is the track of the pen 31 by inertial navigation, to the PC 33, and causes the display device 34 to draw the track of the tip of the pen 31 according to the position change.

In step S17, the pen 31 determines whether or not a predetermined time (for example, about 10 seconds) has elapsed from the timing at which the pen 31 is taken out from the pen stand 32 and an instruction to draw has been given, errors due to inertial navigation have been accumulated, and thus the reliability of the drawing position has become lower than in a predetermined state.

In a case where it is determined in step S17 that the predetermined time has not elapsed and the reliability of the drawing position is not lower than in the predetermined state, that is, in a case where it is determined that there is sufficient reliability in the drawing, the processing returns to step S15. That is, until the predetermined time elapses, the processing in steps S15 to S17 is repeated, and as long as the state where the pen 31 is pulled out from the pen stand 32 and the pressure-sensitive sensor 51 is pressed continues, the track corresponding to the movement of the tip of the pen 31 is continuously drawn on the display device 34.

Then, in a case where it is assumed in step S17 that the predetermined time has elapsed and the reliability of the drawing position has become lower than in the predetermined state, the processing proceeds to step S18.

In step S18, the pen 31 turns off the light emitting unit 52 to present that the calibration is necessary.

In step S19, the pen 31 determines whether or not the power has been turned off and the end has been instructed, and in a case where the power has not been turned off and the end has not been instructed, the processing returns to step S12.

Note that in a case where it is determined in step S12 that the pen 31 is not placed upright in the pen stand 32, the processing in steps S13 to S17 is skipped, and the processing proceeds to step S18.

That is, it is presented that the calibration is necessary by turning off the light emitting unit 52 by the processing in step S18, and the user returns the pen 31 to the pen stand 32 to stand upright, so that the processing in steps S12 to S19 is repeated.

Then, in step S19, when it is assumed that the power is turned off and the end instruction is given, the processing ends.

With the above processing, when the pen 31 is placed upright on the pen stand 32 and is calibrated, the light emitting unit 52 is caused to emit light to present that the calibration is completed. Then, within a predetermined time after the calibration is completed and the drawing is instructed, a track corresponding to the movement of the tip of the pen 31 is drawn on the display device 34 in a state where the drawing operation is performed by pressing of the pressure-sensitive sensor 51.

When the predetermined time has elapsed, the light emitting unit 52 is turned off to present that the calibration is necessary, and accompanying this, the pen 31 is placed upright on the pen stand 32 to perform the calibration. Then, when the calibration is completed, the light emitting unit 52 turns on again, and similar processing is repeated, so that a track corresponding to the movement of the tip of the pen 31 is displayed on the display device 34 as a drawn image.

Since the pressure-sensitive sensor 51 having the protruding shape is placed upright in the hole 32a of the pen stand 32 so as to be fitted into the recess 84a, the pen 31 can implement the appropriate calibration by a simple operation of making one kind of stationary attitude.

<Hardware Configuration Example of Pen Drawing System>

Next, a hardware configuration example of the pen drawing system will be described with reference to FIG. 10.

The pen 31 includes a control unit 101, an acquisition unit 102, a communication unit 103, a multi-IMU 63, a light emitting unit 52, and a pressure-sensitive sensor 51, and is electrically connected by a bus 111 including, for example, a serial bus or the like to enable mutual communication.

The control unit 101 includes a processor, a memory, and the like, and controls the entire operation of the pen 31.

Furthermore, by executing a predetermined application program, the control unit 101 executes the calibration on the basis of the position information (latitude) and the absolute azimuth on the earth acquired in advance by the acquisition unit 102 and the acceleration and the angular velocity detected by the multi-IMU 63, implements inertial navigation processing as described later, and calculates the track of the tip of the pen 31.

Moreover, the control unit 101 controls the light emitting unit 52 when the calibration is completed to emit light to present that the calibration is completed, and turns off the light emitting unit 52 to present that the calibration is necessary when a predetermined time has elapsed from the completion of the calibration.

Furthermore, when the pressure-sensitive sensor 51 is pressed and the drawing operation is instructed, the control unit 101 obtains the position information indicating the track of the tip of the pen 31 by inertial navigation processing, controls the communication unit 103 to transmit the position information to the PC 33, and causes the display device 34 to display the position information.

The acquisition unit 102 receives and acquires an input of an absolute azimuth and a latitude on the earth supplied by an operation input by the user with a keyboard, an operation button, or the like that is not illustrated or from GNSS or the like, and supplies the input to the control unit 101.

Note that the absolute azimuth and the latitude on the earth acquired by the acquisition unit 102 are used as substantially fixed values after being acquired once, and thus the information of the absolute azimuth and the latitude acquired by the acquisition unit 102 is stored and used by the control unit 101.

The communication unit 103 is controlled by the control unit 101, implements communication with the PC 33 by Wi-Fi or the like, for example, and transmits and receives various data and programs.

Figure 10:
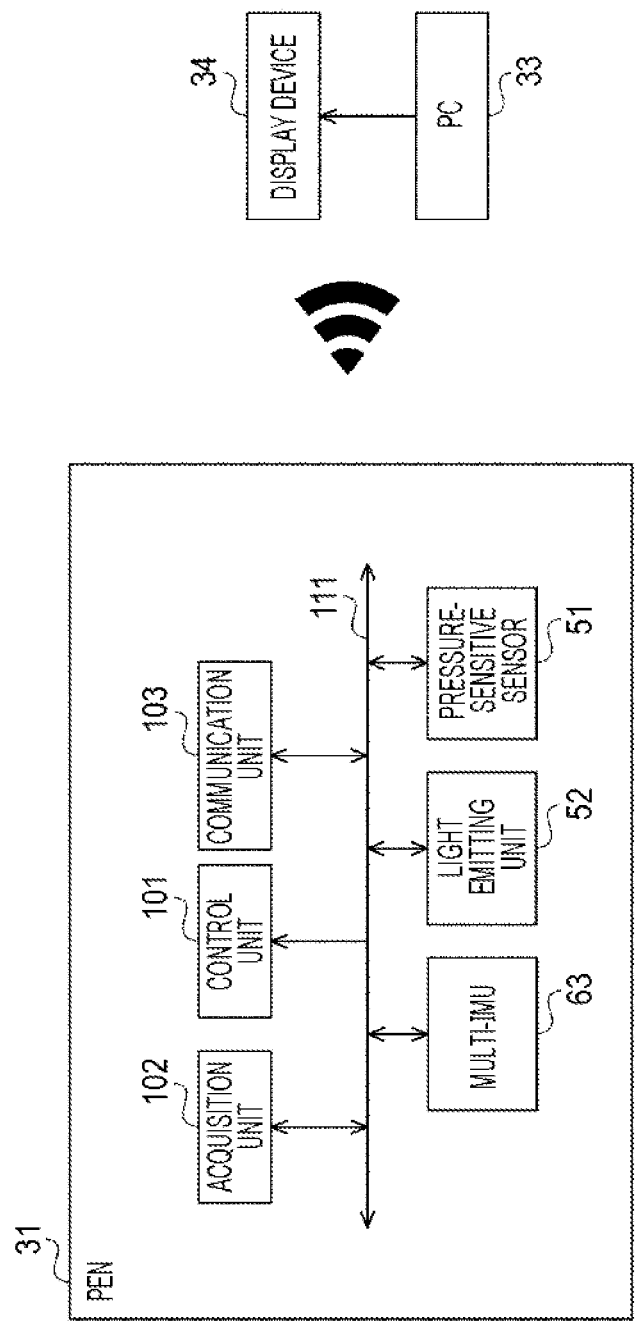
FIG. 10 is a diagram describing a hardware configuration example of the pen constituting the pen drawing system.

<Function Implemented by Control Unit of Pen in FIG. 10>

Next, functions implemented by the control unit 101 of the pen 31 in FIG. 10 will be described with reference to FIG. 11.

The control unit 101 includes an inertial navigation processing unit 131, a light emission control unit 132, a pressure-sensitive sensor processing unit 133, and an external interface (I/F) 134.

Furthermore, the light emission control unit 132 is controlled by the inertial navigation processing unit 131, and when the calibration is completed, supplies a control signal for instructing a control IC 141 that controls the light emitting unit 52 to cause an LED 142 to emit light in order to present that the calibration is completed.

Moreover, when the calibration is necessary, the light emission control unit 132 supplies a control signal for instructing the control IC 141 that controls the light emitting unit 52 to turn off the LED 142 in order to present that the calibration is necessary.

The pressure-sensitive sensor processing unit 133 determines, on the basis of a pressure value supplied from the pressure-sensitive sensor 51, whether or not it is pressed to instruct the drawing operation, and when the pressure value is higher than a predetermined value, outputs a signal indicating that the drawing operation is instructed to the inertial navigation processing unit 131 via the external I/F 134.

When the pen 31 is placed upright on the pen stand 32 to be in a stationary attitude state, the inertial navigation processing unit 131 obtains an initial gravity direction, the autorotation component, and the bias component on the basis of information of the acceleration and the angular velocity detected by the multi-IMU 63 and the absolute azimuth and the latitude acquired by the acquisition unit 102, to thereby implement the calibration.

The inertial navigation processing unit 131 corrects the angular velocity obtained by the multi-IMU 63 with the autorotation component and the bias component to update the attitude rotation matrix to thereby implement the calibration, and obtains time-series position information indicating the track of the tip of the pen 31 by integrating the acceleration obtained by the multi-IMU 63 by inertial navigation.

The inertial navigation processing unit 131 transmits the position information as the time-series position information indicating the track of the tip of the pen 31 from the communication unit 103 to the PC 33 via the external I/F 134, and causes the display device 34 to display the corresponding drawn image.

Figure 11:
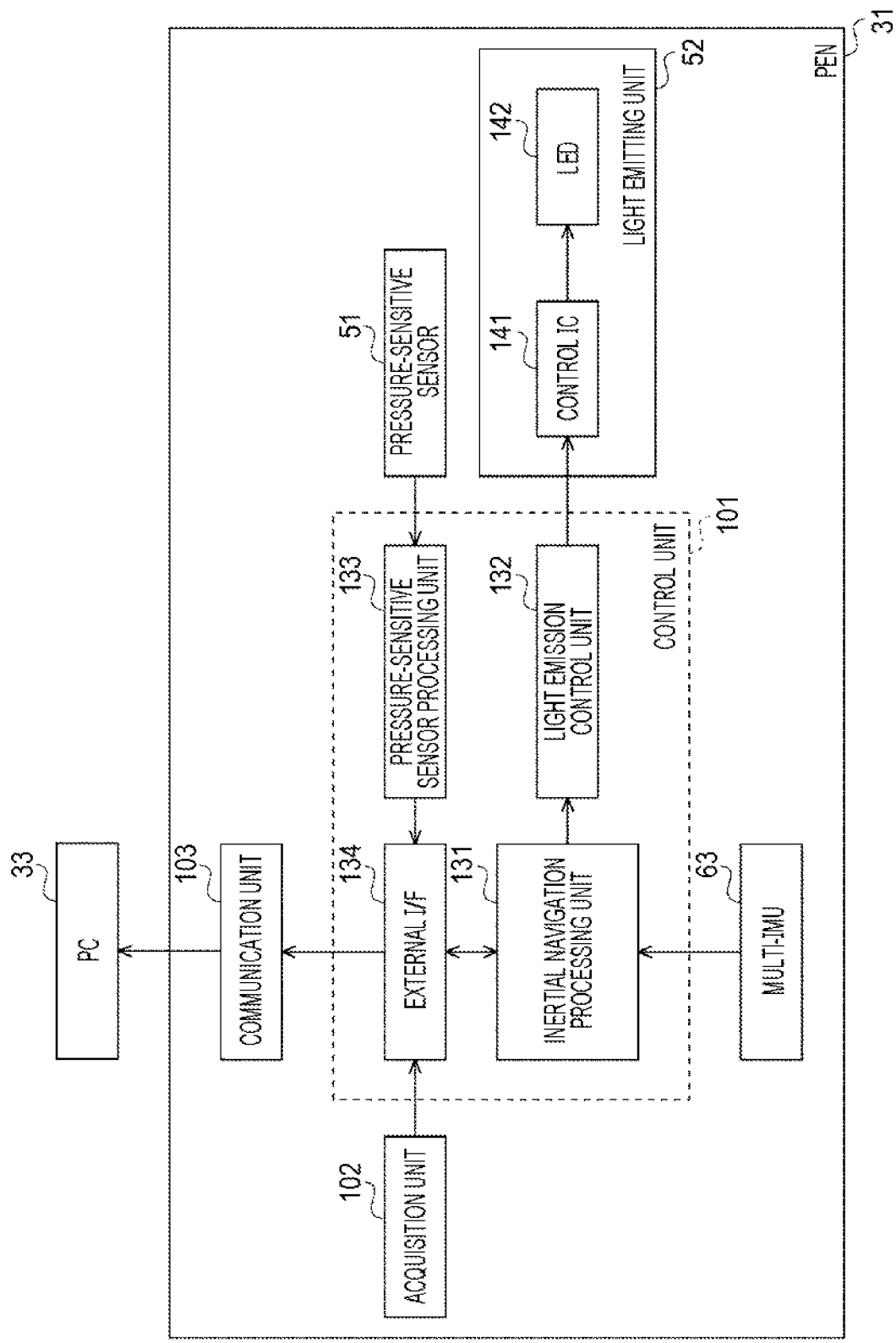
FIG. 11 is a diagram describing functions implemented by a control unit of the pen.

<Function of Implementing Inertial Navigation Processing Unit in FIG. 11>

Next, a configuration example of a function for implementing the inertial navigation processing unit 131 in FIG. 11 will be described with reference to FIG. 12.

The inertial navigation processing unit 131 includes a position-attitude processing unit 151, an initial attitude estimation unit 152, and a stationary determination unit 153.

The stationary determination unit 153 determines whether or not the pen 31 is in a stationary state, that is, whether or not it is in a stationary state of being placed upright on the pen stand 32 on the basis of the information of the acceleration and the angular velocity supplied from the multi-IMU 63, and outputs the determination result to the initial attitude estimation unit 152 and the position-attitude processing unit 151.

When it is determined that the pen 31 is in the stationary state, the position-attitude processing unit 151 and the initial attitude estimation unit 152 assume that it is a state where the calibration is to be executed (initial attitude estimation state), and when the determination result is a non-stationary state, assume that it is a drawing state and switch the operation.

In the initial attitude estimation state, the position-attitude processing unit 151 estimates the autorotation component on the basis of the initial gravity direction supplied from the initial attitude estimation unit 152 and the information of the absolute azimuth and latitude, and supplies an estimation result to the initial attitude estimation unit 152.

The initial attitude estimation unit 152 detects information of roll and pitch of the pen 31 as information of the gravity direction on the basis of the information of the acceleration supplied from the multi-IMU 63, and supplies the information to the position-attitude processing unit 151.

Furthermore, the initial attitude estimation unit 152 estimates the bias component on the basis of the autorotation component supplied from the position-attitude processing unit 151, and supplies the bias component that is an estimation result to the position-attitude processing unit 151.

When in the drawing state, the position-attitude processing unit 151 corrects the attitude rotation matrix on the basis of the autorotation component and the bias component, and obtains the absolute attitude of the pen 31 on the basis of the corrected attitude rotation matrix and a detection result of the multi-IMU 63.

Moreover, the position-attitude processing unit 151 integrates the absolute attitude of the pen 31 to obtain the position and velocity indicating the track of the tip of the pen 31, and outputs the position and velocity.

More specifically, the position-attitude processing unit 151 includes an attitude estimation unit 171, an autorotation estimation unit 172, and an acceleration integration unit 173.

The attitude estimation unit 171 supplies the information of the absolute azimuth and the latitude acquired by the acquisition unit 102 to the autorotation estimation unit 172 to estimate (calculate) the autorotation component.

<Estimation of Autorotation Component>

Here, a method of estimating (calculating) the autorotation component by the autorotation estimation unit 172 will be described.

Figure 13:
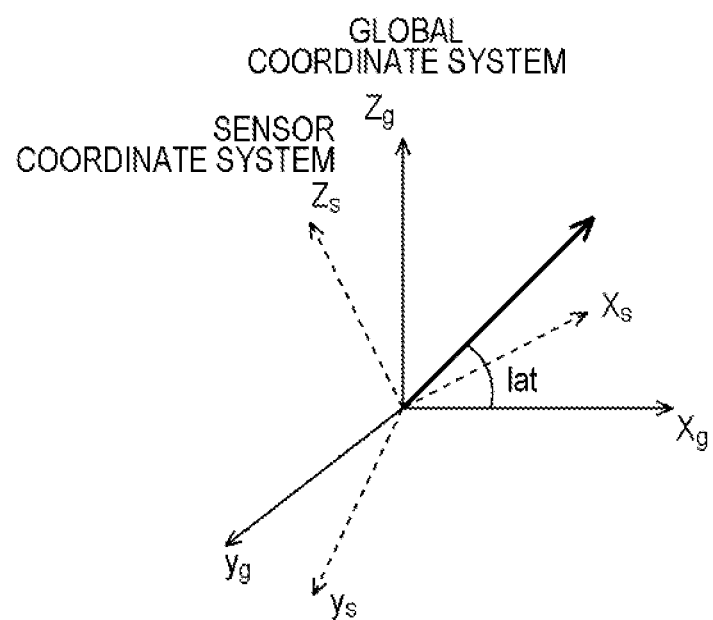
FIG. 13 is a diagram describing a relationship between a global coordinate system and a sensor coordinate system.

For example, as illustrated in FIG. 13, when the global coordinate system $(x_g, y_g, z_g)$ that is a coordinate system expressing a position at a latitude lat on the earth and the sensor coordinate system $(x_s, y_s, z_s)$ that is a coordinate system of the multi-IMU 63 are defined, the autorotation component expressed in the global coordinate system is expressed by the following Expression (1).

[Expression 1]

$$\begin{pmatrix} \omega_{er\_g\_x} \\ \omega_{er\_g\_y} \\ \omega_{er\_g\_z} \end{pmatrix} = \begin{pmatrix} \omega_{er}\cos(\text{lat}) \\ 0 \\ \omega_{er}\sin(\text{lat}) \end{pmatrix} \quad (1)$$

Here, $\omega_{er}$ is the autorotation amount (angular velocity) of the earth and is a fixed value of 15 deg/h, lat is the latitude on the earth, and $\omega_{er\_g\_x}$, $\omega_{er\_g\_x}$, and $\omega_{er\_g\_x}$ represent angular velocity components in an $x_g$-axis direction, a $y_g$-axis direction, and a $z_g$-axis direction, respectively, in the global coordinate system illustrated in FIG. 13.

That is, as illustrated in Expression (1), a component $\omega_{er\_g\_y}$ in the $y_g$-axis direction is zero, a component $\omega_{er\_g\_x}$ in the $x_g$-axis direction is $\omega_{er}$ cos (lat), and a component $\omega_{er\_g\_z}$ in the $z_g$-axis direction is $\omega_{er}$ sin (lat).

When the autorotation component expressed in such a global coordinate system is converted into the sensor coordinate system, it is expressed by the following Expression (2).

[Expression 2]

$$\begin{pmatrix} \omega_{er\_s\_x} \\ \omega_{er\_s\_y} \\ \omega_{er\_s\_z} \end{pmatrix} = f(\text{azimuth, lat}) = M_{g \to s} \begin{pmatrix} \omega_{g\_er\_x} \\ \omega_{g\_er\_y} \\ \omega_{g\_er\_z} \end{pmatrix} \quad (2)$$

Here, $\omega_{er\_s\_x}$, $\omega_{er\_s\_x}$, and $\omega_{er\_s\_x}$ are angular velocity components in the $x_s$ axis direction, the $y_s$ axis direction, and the $z_s$ axis direction in the sensor coordinate system illustrated in FIG. 13, respectively. Furthermore, f(azimuth, lat) is a function expressed by an absolute azimuth and a latitude (lat), and it is indicated that the angular velocity component of the sensor coordinate system is expressed by an inverse matrix $M_{g \to s}$ of the attitude rotation matrix $M_{s \to g}$ for conversion of the global coordinate system into the sensor coordinate system, multiplied by an autorotation component of the global coordinate system.

This attitude rotation matrix $M_{s \to g}$ (and inverse matrix $M_{g \to s}$) is uniquely set on the basis of the gravity direction and the absolute azimuth.

Accordingly, the autorotation estimation unit 172 sets the inverse matrix $M_{g \to s}$ from the information of the gravity direction of the global coordinate system supplied from an initial gravity estimation unit 181 of the initial attitude estimation unit 152 and the absolute azimuth, and calculates the above-described Expression (2) on the basis of the angular velocity of the sensor coordinate system detected by the multi-IMU 63 to estimate (calculate) the autorotation component of the sensor coordinate system.

The attitude estimation unit 171 supplies the autorotation component estimated (calculated) by the autorotation estimation unit 172 to a bias estimation unit 182 of the initial attitude estimation unit 152.

The bias estimation unit 182 estimates the bias component by subtracting the autorotation component from the average value of the angular velocities detected by the multi-IMU 63 in a predetermined time, and supplies the bias component to the attitude estimation unit 171 of the position-attitude processing unit 151.

The attitude estimation unit 171 corrects the detection result of the multi-IMU 63 by subtracting the autorotation component and the bias component from the angular velocity detected by the multi-IMU 63, and updates the attitude rotation matrix $M_{s \to g}$ by attitude calculation using the corrected angular velocity.

Using the updated attitude rotation matrix $M_{s \to g}$, the attitude estimation unit 171 converts the acceleration in the sensor coordinate system, which is the detection result of the multi-IMU 63, into the acceleration in the global coordinate system, and obtains the acceleration as the absolute attitude.

The acceleration integration unit 173 integrates the acceleration, which is the absolute attitude estimated by the attitude estimation unit 171, updates the velocity and the position, and outputs the updated velocity and position as the position information of the track along with the movement of the tip of the pen 31.

When the information of the track along with the movement of the tip of the pen 31 obtained in this manner is transmitted to the PC 33, the PC 33 generates a drawn image based on the track and causes the display device 34 to display the drawn image.

<State Transition>

Next, a state transition related to the operation of the pen drawing system 11 will be described with reference to FIG. 14.

Figure 14:
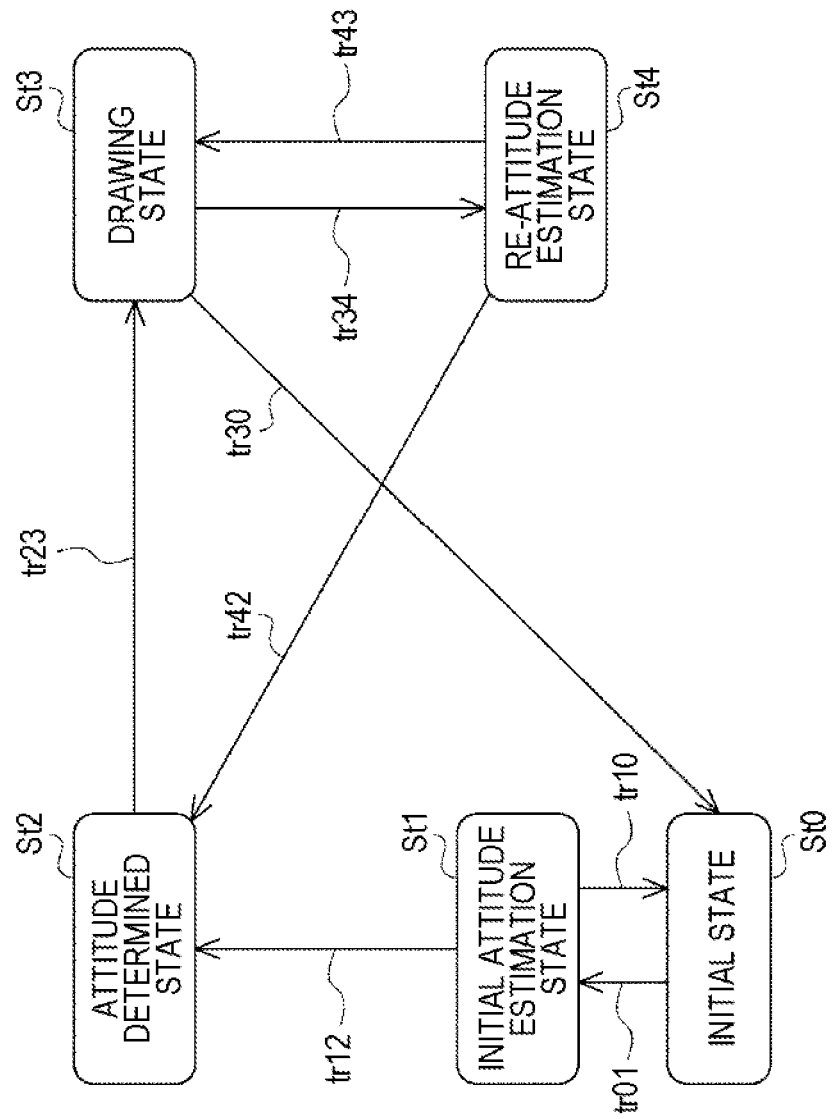
FIG. 14 is a diagram describing a state transition related to operation of the pen drawing system.

As illustrated in FIG. 14, there are five types of states related to the operation of the pen drawing system 11, and the state transitions under a predetermined condition.

More specifically, there are five types of states including an initial state St0, an initial attitude estimation state St1, an attitude determined state St2, a drawing state St3, and a re-attitude estimation state St4.

The initial state St0 is a state immediately after the power is turned on or a state where a predetermined time has elapsed from the timing at which the drawing state where the drawing operation is performed is started, and the detection accuracy of the multi-IMU 63 has become lower than in the predetermined state, and the calibration is necessary.

The initial attitude estimation state St1 is a state where the pen 31 is placed upright on the pen stand 32.

The attitude determined state St2 is a state where the initial gravity direction and the bias component are obtained and the calibration is completed.

The drawing state St3 is a state where the pen 31 is taken out by the user 21 from the pen stand 32 and turned on by pressing the pressure-sensitive sensor 51, and the drawing is instructed.

The re-attitude estimation state St4 is the drawing state St3, and is a state where drawing has not been performed until a predetermined time has elapsed since the drawing is instructed.

In the initial state St0, when it is determined to be the stationary state, the state transitions to the initial attitude estimation state St1 as indicated by an arrow tr01 in FIG. 14.

In the initial attitude estimation state St1, when the initial gravity direction and the bias component are obtained and the calibration is completed in the stationary state, the state transitions to the attitude determined state St2 as indicated by an arrow tr12 in FIG. 14.

Furthermore, in the initial attitude estimation state St1, when it is determined not to be stationary until the calibration is completed, the state returns to the initial state St0 as indicated by an arrow tr10 in FIG. 14.

In the attitude determined state St2, when it is determined not to be in the stationary state, it is assumed that the pen 31 is taken out from the pen stand 32, and the state transitions to the drawing state St3 as indicated by an arrow tr23 in FIG. 14.

In the drawing state St3, it becomes possible to perform drawing, and a track corresponding to the movement of the tip of the pen 31 is obtained by inertial navigation.

Note that, in the drawing state, it is sufficient if the pen 31 is pulled out from the pen stand 32, that is, if an error due to the multi-IMU 63 occurs by inertial navigation, and thus it does not matter whether or not the pressure-sensitive sensor 51 is pressed and the drawing operation is actually performed.

In the drawing state St3, when it is determined that the pen 31 is returned to the pen stand 32 and is in the stationary state until a predetermined time elapses from the timing at which the drawing state is set to the drawing state St3, the state transitions to the re-attitude estimation state St4 as indicated by an arrow tr34 in FIG. 14.

In the re-attitude estimation state St4, when it is determined that the pen 31 is taken out of the pen stand 32 and is not stationary until a predetermined time elapses from the timing at which the state is set to the drawing state St3, the state returns to the drawing state St3.

Furthermore, in the drawing state St3, when the predetermined time has elapsed from the timing at which the state is set to the drawing state St3, the state transitions to the initial state St0.

Moreover, in the re-attitude estimation state St4, when the predetermined time elapses from the timing at which the state is set to the drawing state St3, the stationary state, that is, the state where the pen 31 is placed upright on the pen stand 32 continues. Thus, the initial gravity direction and the bias component are obtained as they are, the calibration is completed, and the state transitions to the attitude determined state St2 as indicated by an arrow tr42 in FIG. 14.

That is, when the pen 31 is powered on, the state becomes the initial state St0, and moreover, when it is assumed that the pen is placed upright on the pen stand 32 and is stationary, the state of the pen 31 transitions to the initial attitude estimation state St1.

When the state transitions to the initial attitude estimation state St1, the initial gravity direction and the bias component are set and the calibration is performed, and when the calibration is completed, the state transitions to the attitude determined state St2.

At this time, the light emitting unit 52 emits light, the completion of the calibration is presented, and the user recognizes that the drawing operation is possible.

Then, when the pen 31 is pulled out from the pen stand 32 and assumed not to be stationary, the state transitions to the drawing state St3.

When the elapsed time from the transition to the drawing state St3 is shorter than a predetermined time (for example, 10 seconds), if the pen 31 is returned to the pen stand 32 and is assumed to be in the stationary state, the state transitions to the re-attitude estimation state St4.

Here, in the re-attitude estimation state St4, in a state where the elapsed time from the transition to the drawing state St3 is shorter than the predetermined time (for example, 10 seconds), when the pen 31 is taken out from the pen stand 32 again and is assumed not to be stationary, the state transitions to the drawing state St3 again.

Furthermore, in the drawing state St3, when the pen 31 is returned to the pen stand 32 in a state where the elapsed time from the transition to the drawing state St3 is shorter than the predetermined time (for example, 10 seconds) and is assumed to be in the stationary state, the state transitions to the re-attitude estimation state St4 again.

That is, in the drawing state St3, if the elapsed time from the transition to the drawing state St3 is shorter than the predetermined time (for example, 10 seconds), it becomes the drawing state St3 if the pen 31 is pulled out from the pen stand 32, and it becomes the re-attitude estimation state St4 if the pen is returned to the pen stand 32.

Then, in the drawing state St3, after the elapsed time from the transition to the drawing state St3 has elapsed by the predetermined time (for example, 10 seconds), the light emitting unit 52 is turned off, the state returns to the initial state St0, and the subsequent state transitions are continued.

Furthermore, in the re-attitude estimation state St4, after the elapsed time from the transition to the drawing state St3 has elapsed by the predetermined time (for example, 10 seconds), the pen 31 is in the state of being placed upright on the pen stand 32 and thus is in the same state as the initial attitude estimation state St1. Thus, the initial gravity direction and the bias component are set as they are, the calibration is performed, and when the calibration is completed, the state transitions to the attitude determined state St2.

The control processing of the pen 31 is processing corresponding to the state transition as illustrated in FIG. 14.

<Control Processing>

Next, control processing of the pen 31 will be described with reference to a flowchart of FIG. 15.

In step S51, the acquisition unit 102 acquires information of the absolute azimuth and latitude of the pen 31, and supplies the information to the inertial navigation processing unit 131 via the external I/F 134. The attitude estimation unit 171 in the position-attitude processing unit 151 of the inertial navigation processing unit 131 holds the information of the absolute azimuth and the latitude supplied from the acquisition unit 102.

Here, the information of the absolute azimuth and the latitude of the pen 31 acquired by the acquisition unit 102 may be acquired as, for example, information input by operation of a keyboard or the like by the user. Furthermore, regarding the information of the latitude, information detected on the basis of a signal from a satellite that is not illustrated may be acquired by a global navigation satellite system (GLASS) device or the like. Note that, as long as it is assumed that the position, orientation, and the like of the pen stand 32 do not change, the information of the absolute azimuth and the latitude only needs to be given once, and thus the processing in step S51 may be skipped after the first acquisition. Furthermore, the information may be acquired in advance separately from the processing and stored in the control unit 101.

In step S52, the position-attitude processing unit 151 acquires and buffers information of one sample of the angular velocity and the acceleration supplied from the multi-IMU 63.

In step S53, the position-attitude processing unit 151 executes state transition processing, and determines and transitions the state in the control processing of the pen 31.

Figure 16:
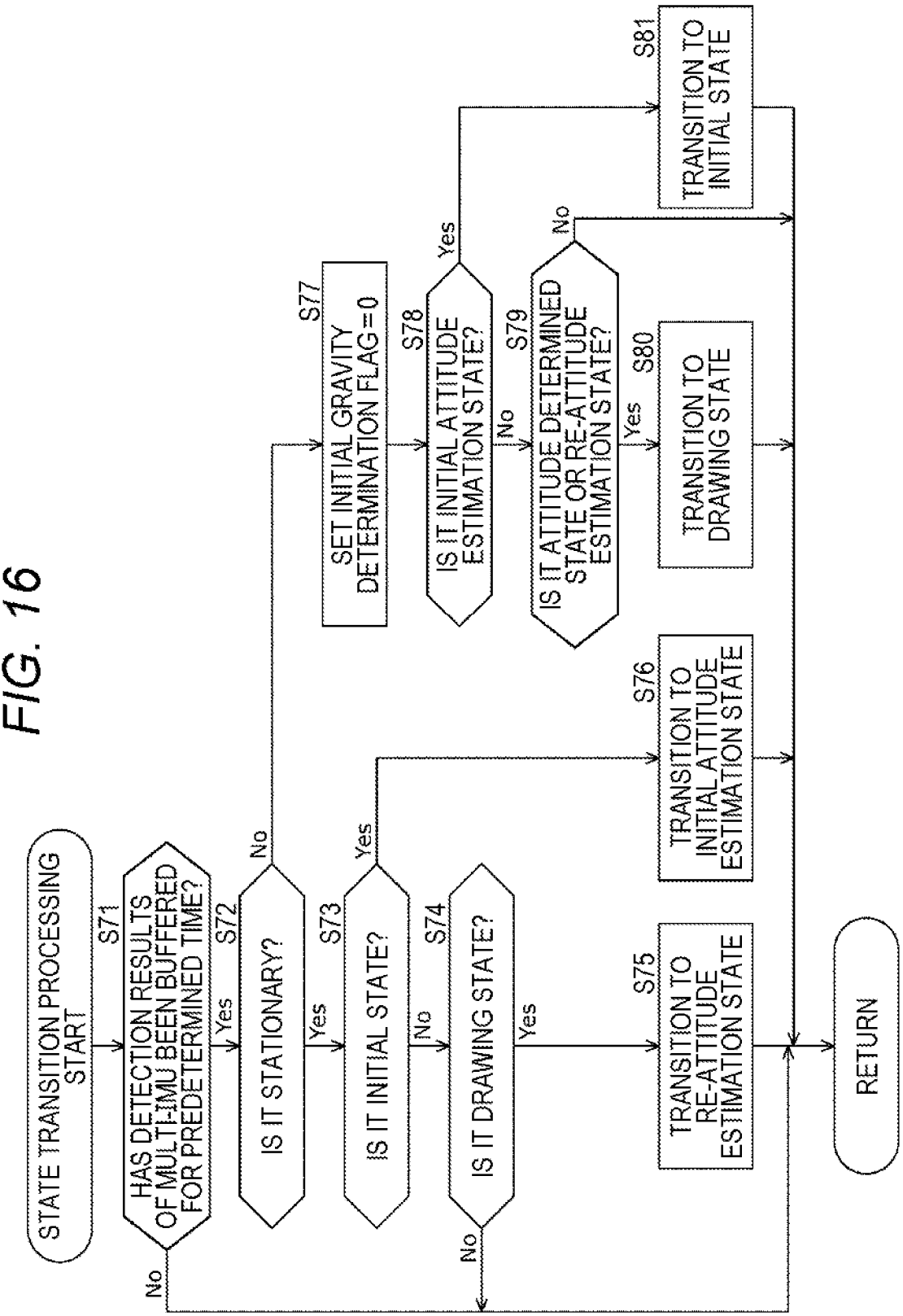
FIG. 16 is a flowchart describing state transition processing in FIG. 15.

Note that the state transition processing will be described later in detail with reference to a flowchart of FIG. 16.

In step S54, the position-attitude processing unit 151 determines whether or not the current state is the initial state St0.

In step S54, in a case where the current state is not the initial state St0, the processing proceeds to step S55.

In step S55, the position-attitude processing unit 151 determines whether or not the current state is the drawing state St3.

In a case where it is determined in step S55 that the current state is not the drawing state, the processing proceeds to step S56.

In step S56, the initial gravity estimation unit 181 of the initial attitude estimation unit 152 executes initial gravity estimation processing to estimate the initial gravity direction.

Figure 17:
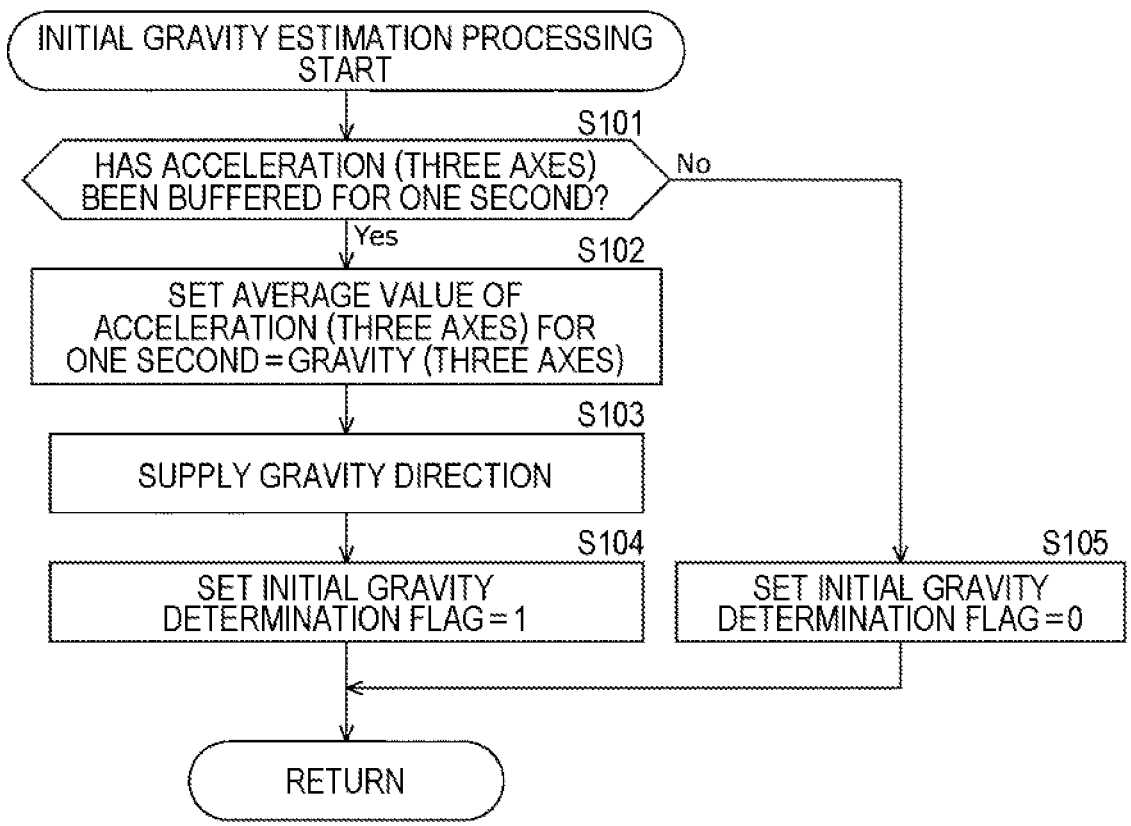
FIG. 17 is a flowchart describing initial gravity estimation processing in FIG. 15.

Note that the initial gravity estimation processing will be described later in detail with reference to a flowchart of FIG. 17.

In step S57, the bias estimation unit 182 of the initial attitude estimation unit 152 executes bias estimation processing to estimate a bias component.

Figure 18:
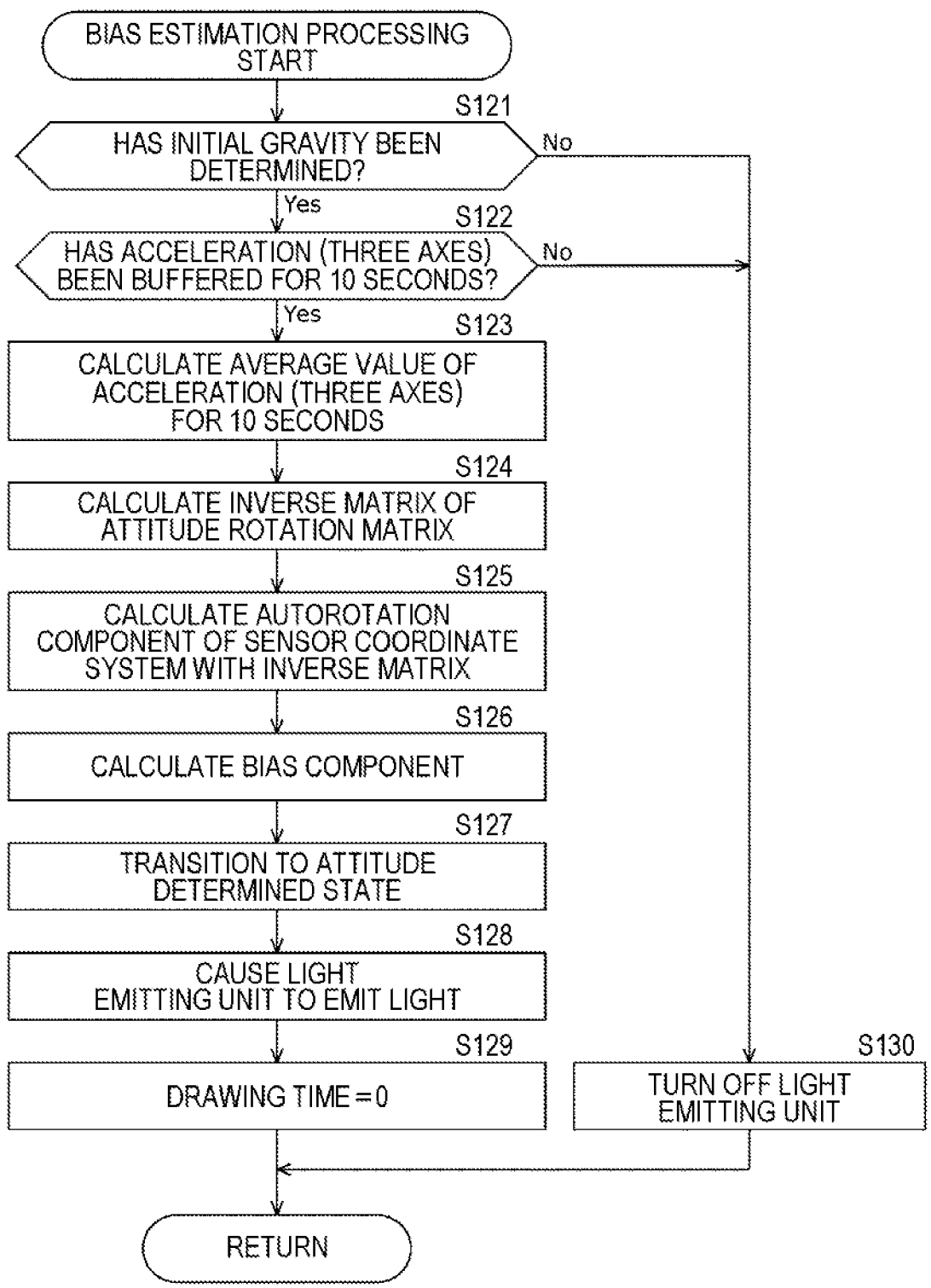
FIG. 18 is a flowchart describing bias estimation processing in FIG. 15.

Note that the bias estimation processing will be described later in detail with reference to a flowchart of FIG. 18.

Furthermore, in a case where it is determined in step S55 that the current state is the drawing state, the processing proceeds to step S58.

In step S58, the position-attitude processing unit 151 executes the drawing processing and supplies the PC 33 with the position information indicating the track corresponding to the movement of the tip of the pen 31. When acquiring the position information corresponding to the track, the PC 33 generates a drawn image corresponding to the position information and causes the display device 34 to display the drawn image.

Figure 19:
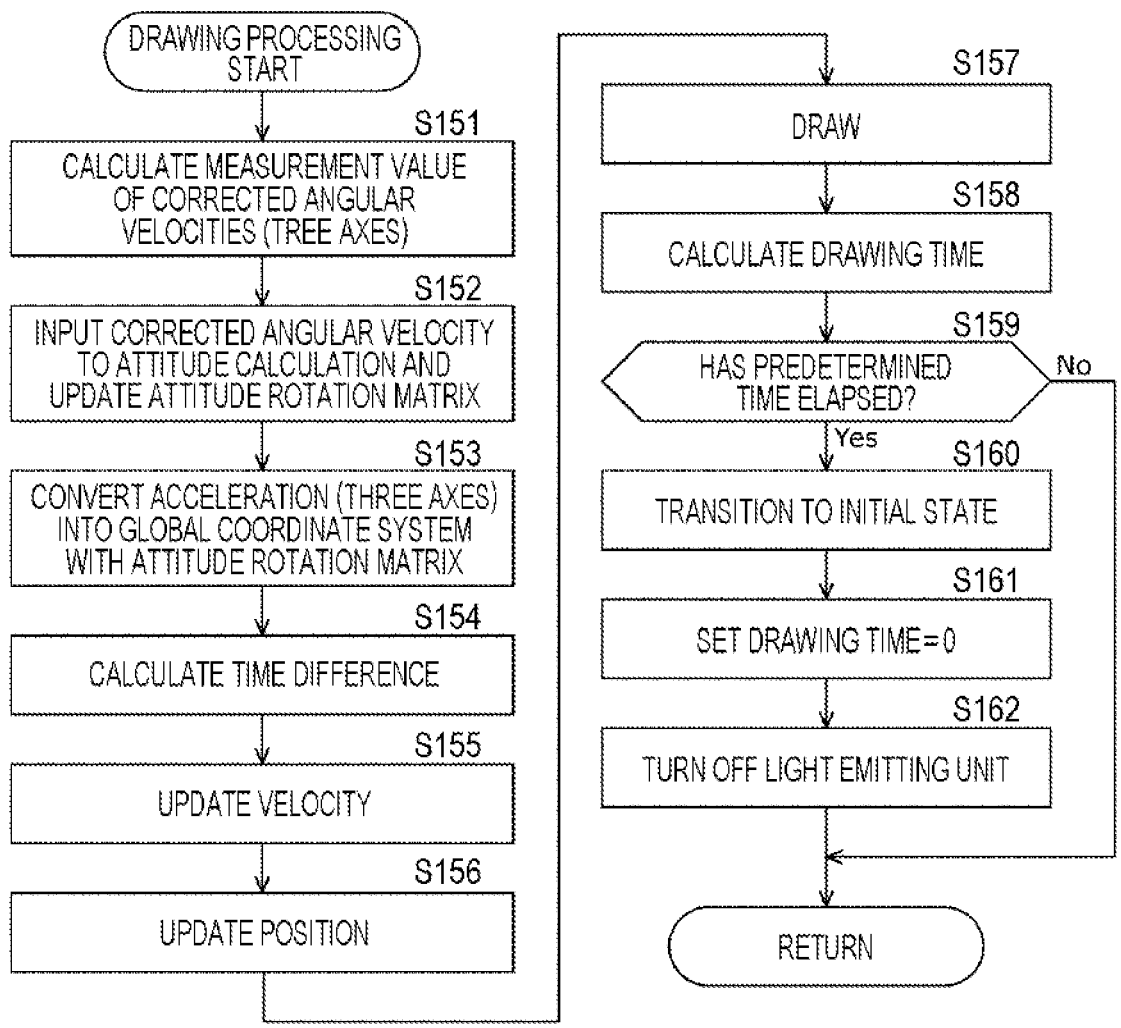
FIG. 19 is a flowchart describing drawing processing illustrated in FIG. 15.

Note that the drawing processing will be described later in detail with reference to a flowchart in FIG. 19.

Moreover, in a case where it is determined in step S54 that the current state is not the initial state, the processing in steps S55 to S58 is skipped.

In step S59, the position-attitude processing unit 151 determines whether or not the end of the processing has been instructed.

In step S59, in a case where the end of the processing has not been instructed, the processing returns to step S52.

That is, the processing in steps S52 to S59 is repeated until the end of the processing is instructed.

Then, in step S59, when the end of the processing is instructed, the processing ends.

By performing the series of processes described above, the operation of the pen 31 is controlled, and the user 21 grips the pen 31 and moves the tip, so that the track corresponding to the movement of the tip is obtained, and a drawn image corresponding to the track can be displayed on the display device 34.

Figure 9:
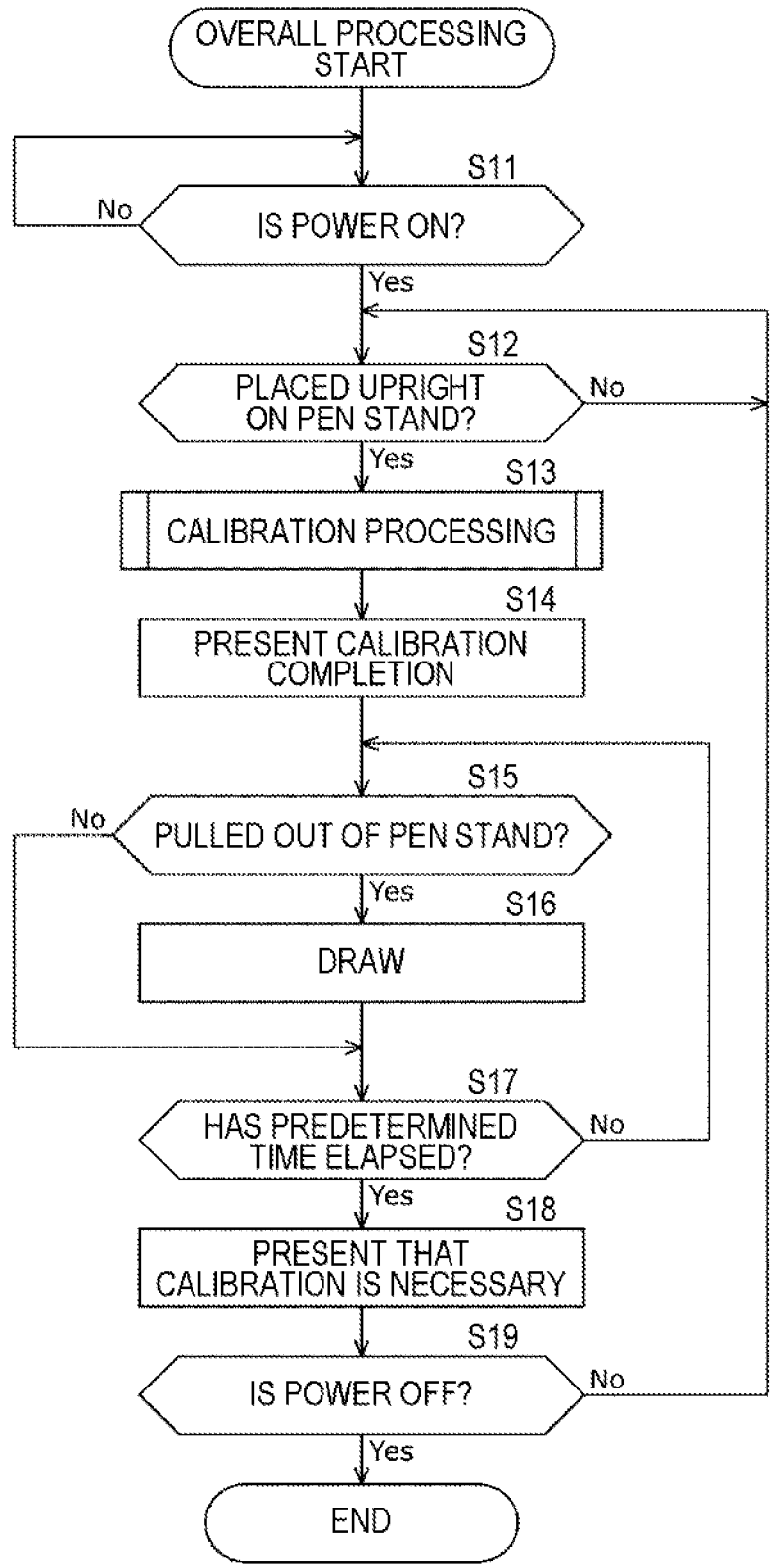
FIG. 9 is a flowchart describing overall processing of the pen drawing system.

Note that by obtaining the autorotation component and the bias component by the initial gravity estimation processing and the bias estimation processing in steps S56 and S57, the calibration processing described with reference to the flowchart of FIG. 9 is substantially implemented.

That is, the gravity direction is obtained by the initial gravity estimation processing as described later, the autorotation component of the global coordinate system is obtained from the information of the latitude by the bias estimation processing to be described later, the inverse matrix $M_{g \to s}$ of the attitude rotation matrix $M_{s \to g}$ is obtained on the basis of the gravity direction and the absolute azimuth, the autorotation component of the global coordinate system is converted into the autorotation component of the sensor coordinate system by the inverse matrix $M_{g \to s}$, and the bias component of the sensor coordinate system is obtained from the difference between the average value of the angular velocities detected by the multi-IMU 383 in the stationary attitude and the autorotation component of the sensor coordinate system.

Here, since the autorotation component of the sensor coordinate system is obtained by the latitude, the gravity direction, and the absolute direction, information detected by the multi-IMU 383 in the stationary attitude is not necessary. Furthermore, since the bias component is obtained from the information detected by the multi-IMU 383 in the stationary attitude and the autorotation component, it is possible to implement the calibration in one type of stationary attitude.

<State Transition Processing>

Next, the state transition processing will be described with reference to the flowchart of FIG. 16.

In step S71, the stationary determination unit 153 determines whether or not information of the angular velocity and the acceleration, which are detection results of the multi-IMU 63, has been buffered for a predetermined time (for example, one second).

In a case where it is determined in step S71 that the information of the angular velocity and the acceleration, which are detection results of the multi-IMU 63, has been buffered for the predetermined time, the processing proceeds to step S72.

Note that, in a case where it is determined in step S71 that the information of the angular velocity and the acceleration, which are detection results of the multi-IMU 63, has not been buffered for the predetermined time, the state transition processing ends.

In step S72, the stationary determination unit 153 determines whether or not the pen 31 is stationary on the basis of the buffered information of the angular velocity and the acceleration, which are detection results of the multi-IMU 63.

In a case where it is determined in step S72 that it is stationary, the processing proceeds to step S73.

In step S73, the attitude estimation unit 171 determines whether or not the current state is the initial state St0.

In a case where it is determined in step S73 that the current state is not the initial state St0, the processing proceeds to step S74.

In step S74, the attitude estimation unit 171 determines whether or not the current state is the drawing state St3.

In a case where it is determined in step S74 that the current state is the drawing state St3, the processing proceeds to step S75.

In step S75, the attitude estimation unit 171 transitions the current state to the re-attitude estimation state St4 as indicated by an arrow tr34 in FIG. 14.

Note that in a case where it is determined in step S74 that the current state is not the drawing state St3, the processing in step S75 is skipped.

Furthermore, in a case where it is determined in step S73 that the current state is the initial state St0, the processing proceeds to step S76.

In step S76, the attitude estimation unit 171 transitions to the initial attitude estimation state St1 as indicated by an arrow tr01 in FIG. 14.

On the other hand, in step S72, in a case where it is not stationary and the pen 31 is taken out of the pen stand 32 and it is assumed that there is some movement, the processing proceeds to step S77.

In step S77, the attitude estimation unit 171 sets an initial gravity determination flag to zero, and sets that the information of the initial gravity direction is not obtained.

In step S78, the attitude estimation unit 171 determines whether or not the current state is the initial attitude estimation state St1.

In a case where it is determined in step S78 that the current state is not the initial attitude estimation state St1, the processing proceeds to step S79.

In step S79, the attitude estimation unit 171 determines whether or not the current state is the attitude determined state St2 or the re-attitude estimation state St4.

In step S79, in a case where the current state is the attitude determined state St2 or the re-attitude estimation state St4, the processing proceeds to step S80.

In step S80, the attitude estimation unit 171 transitions the current state to the drawing state St3 as indicated by an arrow tr23 or tr43 in FIG. 14.

Furthermore, in step S79, in a case where the current state is neither the attitude determined state St2 nor the re-attitude estimation state St4, the processing ends.

Moreover, in a case where it is determined in step S78 that the current state is the initial attitude estimation state St1, the processing proceeds to step S80.

In step S80, the attitude estimation unit 171 transitions the current state to the initial state St0 as indicated by an arrow tr10 in FIG. 14.

Through the above series of processing, the state transition described with reference to FIG. 14 is controlled.

<Initial Gravity Estimation Processing>

Next, the initial gravity estimation processing will be described with reference to the flowchart of FIG. 17.

In step S101, the initial gravity estimation unit 181 of the initial attitude estimation unit 152 determines whether or not the acceleration, which is a detection result of the multi-IMU 63, is buffered for a predetermined time, for example, one second.

In a case where it is determined in step S101 that the accelerations of three axes, which are detection results of the multi-IMU 63, are buffered for the predetermined time, for example, one second, the processing proceeds to step S102.

In step S102, the initial gravity estimation unit 181 calculates an average value of the buffered accelerations of the three axes as gravity information.

In step S103, the initial gravity estimation unit 181 supplies information of the calculated initial gravity to the attitude estimation unit 171 of the position-attitude processing unit 151.

In step S104, the attitude estimation unit 171 sets the initial gravity determination flag to one as information indicating that the information of the initial gravity has been set.

Note that, in step S101, in a case where it is determined that the accelerations of the three axes, which are detection results of the multi-IMU 63, are not buffered for the predetermined time, for example, one second, and the initial gravity cannot be obtained, the processing proceeds to step S105.

In step S105, the attitude estimation unit 171 sets the initial gravity determination flag to zero as information indicating that the information of the initial gravity is not set.

By the above processing, the initial gravity is set, and the initial gravity determination flag is set according to whether or not the initial gravity is set.

<Bias Estimation Processing>

Next, the bias estimation processing will be described with reference to the flowchart of FIG. 18.

In step S121, the bias estimation unit 182 of the initial attitude estimation unit 152 makes an inquiry to the attitude estimation unit 171 of the position-attitude processing unit 151, and determines whether or not the initial gravity determination flag is set to one and the initial gravity is determined.

In a case where it is determined in step S121 that the initial gravity determination flag is set to one and the initial gravity direction is determined, the processing proceeds to step S122.

In step S122, it is determined whether or not the information of the angular velocities of the three axes detected by the gyro sensor among the detection results supplied from the multi-IMU 63 is buffered for a predetermined time, for example, 10 seconds.

In a case where it is determined in step S122 that the information of the angular velocities of the three axes has been buffered for the predetermined time, for example, 10 seconds, the processing proceeds to step S123.

In step S123, the bias estimation unit 182 calculates an average value for 10 seconds of the angular velocities of the three axes as the sum of the bias component and the autorotation component. That is, since the pen 31 is in a stationary state here, the average value of the angular velocities of the three axes is calculated as the average value of the sum of the bias component and the autorotation component.

In step S124, the attitude estimation unit 171 sets an inverse matrix $M_{g \to s}$ of the attitude rotation matrix $M_{s \to g}$ on the basis of the obtained initial gravity direction and the held absolute azimuth, and supplies the inverse matrix $M_{g \to s}$ to the autorotation estimation unit 172.

In step S125, the autorotation estimation unit 172 estimates (calculates) the autorotation component of the global coordinate system on the basis of the held latitude information as described with reference to Expression (1). Then, the autorotation estimation unit 172 converts the autorotation component of the global coordinate system into the autorotation component of the sensor coordinate system by using the information of the inverse matrix $M_{g \to s}$ by the method described with reference to FIG. 13 and Expression (2), and supplies the autorotation component to the attitude estimation unit 171.

The attitude estimation unit 171 supplies the autorotation component estimated (calculated) by the autorotation estimation unit 172 to the bias estimation unit 182 of the initial attitude estimation unit 152.

In step S126, the bias estimation unit 182 estimates (calculates) the bias component of the sensor coordinate system by subtracting the autorotation component of the sensor coordinate system from the average value of the angular velocities of the three axes, and outputs the bias component to the attitude estimation unit 171.

In step S127, the attitude estimation unit 171 transitions the current state to the attitude determined state St2.

In step S128, the attitude estimation unit 171 notifies the light emission control unit 132 of information indicating that the current state is the attitude determined state St2. With this notification, the light emission control unit 132 causes the LED 142 of the light emitting unit 52 to emit light, thereby presenting that the calibration has been completed by the user and it is in a drawing possible state.

In step S129, the attitude estimation unit 171 sets the drawing time to zero.

On the other hand, in a case where it is determined in step S121 that the initial gravity determination flag is set to zero and the initial gravity is not determined, or in a case where it is determined in step S122 that the information of the angular velocity of the axis has not been buffered for the predetermined time, for example, 10 seconds, the processing proceeds to step S130.

In step S130, the attitude estimation unit 171 notifies the light emission control unit 132 of information indicating that the current state is not the attitude determined state St2. With this notification, the light emission control unit 132 turns off the LED 142 of the light emitting unit 52 to present that the calibration has not been completed by the user and it is not in a drawing possible state.

By the above processing, the bias component of the sensor coordinate system is estimated (calculated) after the initial gravity is set, and the light emitting unit 52 emits light when the bias component is estimated, so that when the bias component of the sensor coordinate system is estimated and the calibration is completed, it is possible to present to the user that it is in a drawing possible state.

<Drawing Processing>

Next, drawing processing will be described with reference to the flowchart of FIG. 19.

In step S151, the attitude estimation unit 171 corrects the angular velocity by subtracting the autorotation component and the bias component of the sensor coordinate system from the angular velocities of the three axes detected by the multi-IMU 63.

In step S152, the attitude estimation unit 171 updates the attitude rotation matrix $M_{s \to g}$ by attitude calculation on the basis of the information of the corrected angular velocity.

In step S153, the attitude estimation unit 171 converts the acceleration detected by the multi-IMU 63 into an acceleration in the global coordinate system by the updated attitude rotation matrix $M_{s \to g}$, obtains the absolute attitude of the pen 31, and outputs the absolute attitude to the acceleration integration unit 173.

In step S154, the acceleration integration unit 173 calculates a time difference between the time of one previous sample and the current time.

In step S155, the acceleration integration unit 173 updates the velocity by adding a change amount of the velocity obtained by multiplying the current acceleration by the time difference to the current velocity.

In step S156, the acceleration integration unit 173 updates the position by adding a change amount of the position obtained by multiplying the current velocity by the time difference to the current position.

In step S157, the acceleration integration unit 173 transmits information of the position and the velocity to the PC 33 via the external I/F 134 as the position information indicating the track of the tip of the pen 31. The PC 33 generates the drawn image on the basis of the position information indicating the track of the tip of the pen 31 including the information of the position and the velocity, and causes the display device 34 to display the drawn image.

In step S158, the attitude estimation unit 171 increments the drawing time by a predetermined time to update the drawing time.

In step S159, the attitude estimation unit 171 determines whether or not the drawing time has elapsed by a predetermined time (for example, 10 seconds), an integrated error by the acceleration integration unit 173 has increased, the positional accuracy has become lower than in a predetermined state, and the calibration is necessary.

In a case where it is determined in step S159 that the drawing time has elapsed by the predetermined time, the integrated error by the acceleration integration unit 173 has increased, the positional accuracy has become lower than in the predetermined state, and the calibration is necessary, the processing proceeds to step S160.

In step S160, the attitude estimation unit 171 transitions the current state to the initial state St0.

In step S161, the attitude estimation unit 171 initializes the drawing time to zero.

In step S162, the attitude estimation unit 171 notifies the light emission control unit 132 of information indicating that the current state is the initial state St0. With this notification, the light emission control unit 132 turns off the LED 142 of the light emitting unit 52 to present to the user that the calibration has not been completed and the drawing is disabled.

Note that, in a case where it is determined in step S159 that the drawing time has not elapsed by the predetermined time (for example, 10 seconds) and the calibration is not necessary, the processing in steps S160 to S162 is skipped, and the light emitting unit 52 emitting light continuously presents that it is in the drawing possible state.

According to the above processing, the autorotation component that causes the error in the multi-IMU 63 is calculated by the information of the absolute azimuth and the latitude, and the bias component is obtained with the obtained autorotation component and one type of stationary attitude in which the pen 31 is placed upright on the pen stand 32, so that it is possible to implement easy and appropriate calibration.

Modification Example 1

In the above description, the example has been described in which the pen 31 is placed upright on the pen stand 32, the light emitting unit 52 emits light when the calibration is completed, the pen 31 is pulled out from the pen stand 32, and when the predetermined time has elapsed from the start of the drawing operation and the reliability of the drawing position becomes lower than in the predetermined state by the integration processing of the acceleration, the light emitting unit 52 is turned off.

That is, an example has been described in which it is presented that the calibration has been completed or that the reliability of the drawing position has become lower than in the predetermined state according to the light emitting state of the light emitting unit 52.

However, similar information may be presented in the drawn image displayed on the display device 34.

Figure 20:
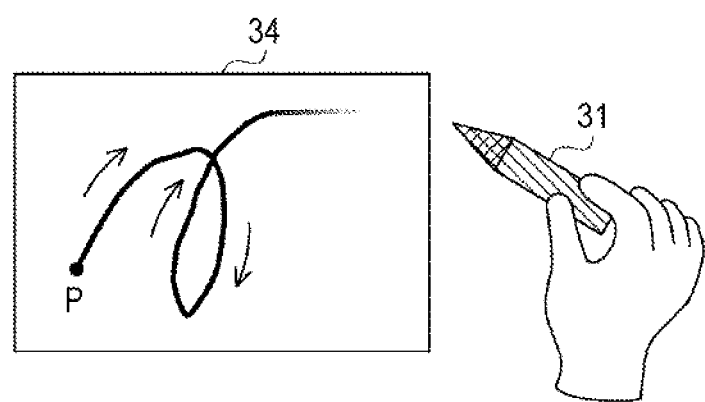
FIG. 20 is a view describing modification example 1 of an external configuration of the pen and the pen stand.

For example, as illustrated in FIG. 20, when a drawing operation is performed with the pen 31 to draw in an arrow direction from a start point P in the display surface of display device 34, the drawing may be performed with a depth corresponding to the reliability of the drawing position along with the elapsed time of the drawing operation.

That is, in FIG. 20, the drawing close to the start point P is displayed in a dark color, but as the drawing operation proceeds, the color may become lighter and gradually blur along with the elapsed time, that is, along with the decrease in reliability, finally reaching a state that no color is added and no drawing is performed.

In this way, the user can recognize the degree of decrease in reliability while viewing the drawn image displayed on the display device 34, and can recognize that the reliability of the drawing position is lower than in the predetermined state and the calibration is necessary by the state that no color is added and no drawing is performed.

Modification Example 2

In the above description, an example has been described above in which, by placing upright on the pen stand 32 so that the pressure-sensitive sensor 51 of the pen 31 and the recess 84a of the cover 84 of the pen stand 32 face each other, the positional relationship between the pen stand 32 and the pen 31 is configured to be a constant relationship.

However, any other configuration may be used as long as the positional relationship between the pen 31 and the pen stand 32 can be kept constant.

Figure 21:
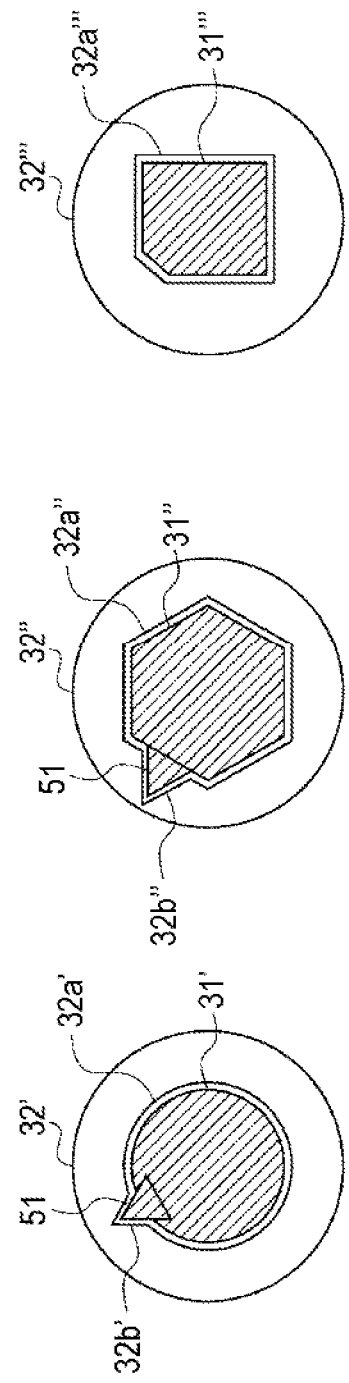
FIG. 21 is a view describing modification example 2 of external configurations of the pen and the pen stand.

For example, as illustrated in the left part of FIG. 21, a pen 31' provided with a projecting portion 31a' and a pen stand 32' provided with a hole 32a' having a cutout portion at a corresponding position may be used.

That is, when a cross-sectional shape including the projecting portion 31a' of the pen 31' and a cross-sectional shape of the hole 32a' of the pen stand 32' match, the pen 31' can be placed upright on the pen stand 32', and thus the mutual positional relationship can be kept constant.

Note that FIG. 21 is a top view of the hole 32a' with the pen 31' placed upright on the pen stand 32'.

Furthermore, as illustrated in the center part of FIG. 21, a polygonal pen 31" may be formed and a projecting portion 31a" may be provided, and a hole 32a" having a cutout portion may be provided at a corresponding position of the pen stand 32".

That is, when a cross-sectional shape including the projecting portion 31a" in the pen 31" and a cross-sectional shape of the hole 32a" of the pen stand 32" match, the pen 31" can be placed upright on the pen stand 32", and thus the mutual positional relationship can be kept constant.

Moreover, as illustrated in the right part of FIG. 21, a pen 31''' configured in an asymmetric shape may be used, and a corresponding asymmetric hole 32a''' may be provided in the pen stand 32'''.

That is, when a cross-sectional shape including a projecting portion 31a''' in the pen 31''' and a cross-sectional shape of the hole 32a''' of the pen stand 32''' match, the pen 31''' can be placed upright on the pen stand 32''', and thus the mutual positional relationship can be kept constant.

Modification Example 3

In the above description, the configuration has been described in which the pen stand 32 is formed by clear acrylic resin having a hollow portion, and the hollow portion is filled with a colored liquid, so that the light emitting state of the light emitting unit 52 of the pen 31 can be visually recognized.

Figure 22:
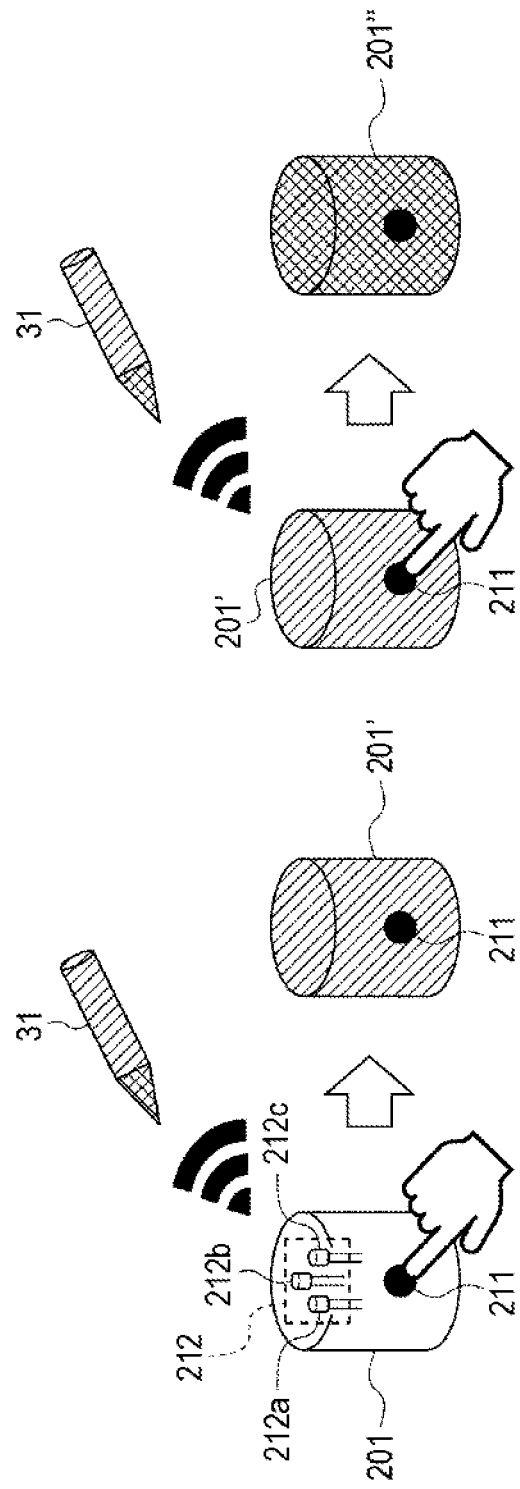
FIG. 22 is a view describing modification example 3 of external configurations of the pen and the pen stand.

However, as long as the light emitting state of the light emitting unit 52 of the pen 31 can be visually recognized by the user, any other configuration may be employed, and for example, as illustrated by a pen stand 201 of FIG. 22, the light emitting unit 212 separately provided may emit light or be turned off according to the light emitting or turn-off state of the light emitting unit 52 of the pen 31.

At this time, for example, as illustrated in FIG. 22, the light emitting unit 212 may include a plurality of LEDs 212a to 212c that emit light of different colors, and the color of emitted light may be switched according to the number of times of pressing a changeover switch 211.

For example, among the LEDs 212a to 212c illustrated in the left part of FIG. 22, the LED 212a is configured to emit light when the changeover switch 211 is pressed once, so as to emit light in a color as indicated by the pen stand 201'.

Then, as illustrated in the right part of FIG. 21, it may be configured such that, when the changeover switch 211 is pressed twice and the pen 31 is placed upright next time, the LED 212b is configured to emit light instead of the LED 212a. In this case, when the pen 31 is placed upright on the pen stand 201', light may be emitted in a color different from that of the pen stand 201' as indicated by the pen stand 201".

In this case, the pen stand 201 and the pen 31 may be notified that the color has been switched by the changeover switch 211 of the pen stand 201 by short-range wireless communication such as Bluetooth (registered trademark), and the color of the drawn line displayed on the display device 34 may change according to the color of light emitted from the LEDs 212a to 212c.

2. Application Example

In the above description, the example in which the information of the absolute azimuth is acquired by using the GNSS or inputting by the user, or the like has been described. However, the multi-IMU may be incorporated in the pen stand so that the absolute azimuth can be detected by the pen stand, the information of the absolute azimuth can be acquired by the pen from the pen stand when the pen is placed upright on the pen stand, and the calibration may be implemented by cooperative processing between the pen and the pen stand.

That is, the pen stand 301 in which the multi-IMU is incorporated and which is capable of detecting the absolute azimuth detects the absolute azimuth on the basis of two types of stationary attitudes, and supplies the detected absolute azimuth to the pen 331.

Figure 23:
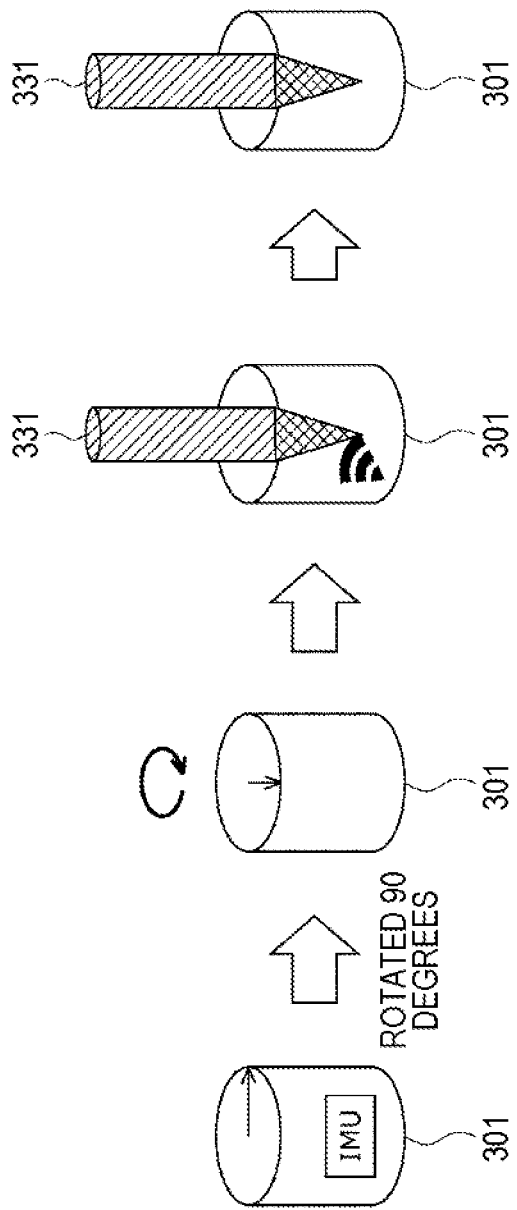
FIG. 23 is a view describing an application example of the pen drawing system.

More specifically, as illustrated in the leftmost part of FIG. 23, after a predetermined time elapses in a first stationary attitude, for example, when the pen stand 301 is rotated by 90 degrees and a predetermined time elapses in the second stationary attitude as illustrated in the second part from the left in FIG. 23, the pen stand 301 acquires two types of detection results by the multi-IMU in two types of stationary attitude, and acquires the absolute azimuth on the basis of the acquired two types of detection results.

Since the pen stand 301 is generally moved less frequently once placed, the pen stand 301 is placed such that the user takes two kinds of stationary attitudes so that the absolute azimuth is detected when the pen stand is placed first.

Thereafter, as illustrated in the second part from the right in FIG. 23, when the pen 331 is placed upright on the pen stand 301, the obtained absolute azimuth is transmitted from the pen stand 301 to the pen 331 by communication such as Wi-Fi, for example.

Thereafter, the calibration of the pen 331 is implemented as illustrated in the rightmost part of FIG. 23 by a method similar to the above-described method.

<Azimuth Difference Between Pen Stand and Pen>

At the time of the calibration, the absolute azimuth supplied from the pen stand 301 is a value based on a front direction of the pen stand 301, and is not the same as the front direction of the pen 331.

Accordingly, the pen 331 obtains an azimuth difference between the pen stand 301 and the pen 331 in advance, corrects the absolute azimuth supplied from the pen stand 301, and executes the calibration.

Figure 24:
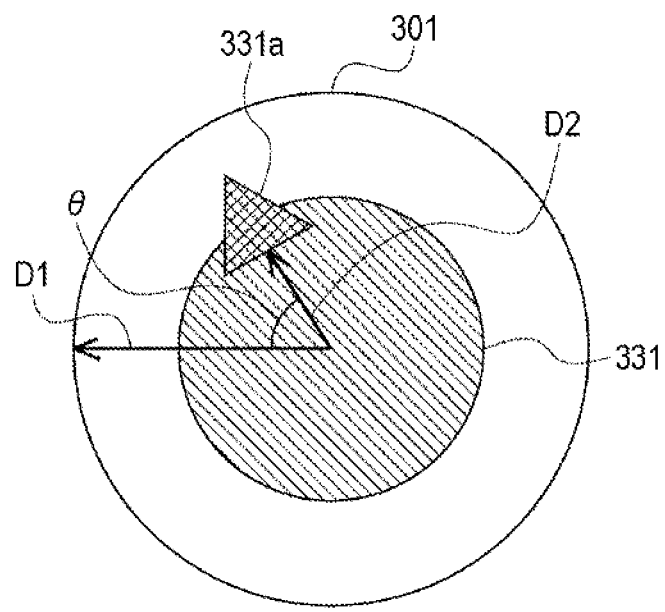
FIG. 24 is a view describing an azimuth difference between the pen and the pen stand.

More specifically, as illustrated in FIG. 24, a difference between the front direction D1 of the pen stand 301 and the front direction D2, which is the position of the pressure-sensitive sensor 51 of the pen 331, is an azimuth difference θ.

Thus, the pen 331 subtracts the azimuth difference θ from the absolute azimuth supplied from the pen stand 301 as a correction to the absolute azimuth of the pen 331, and uses this absolute azimuth for the calibration. Note that this azimuth difference θ is a fixed value, and thus is made acquirable from the outside with respect to the pen 331 in advance.

<Update of Absolute Azimuth of Pen Stand>

Figure 25:
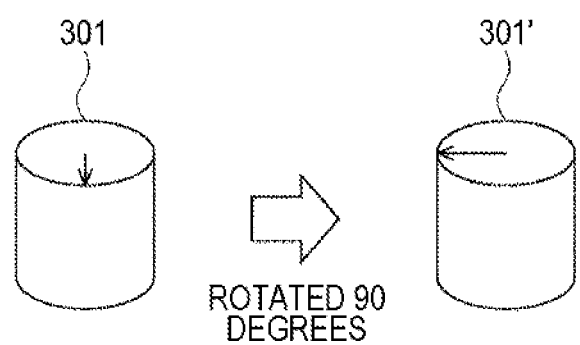
FIG. 25 is a diagram describing an example of updating an absolute azimuth after the absolute azimuth of the pen stand is obtained.

The pen stand 301 is basically moved at a low frequency once placed, but in a case where a change is added so that the direction rotates 90 degrees as indicated by a pen stand 301' as illustrated in FIG. 25 after the absolute azimuth is obtained, an update may be performed by acceleration integration, or the absolute azimuth may be obtained again by the calibration using two types of stationary attitudes.

<Hardware Configuration Example of Pen Drawing System that Implements Calibration by Cooperative Processing Between Pen and Pen Stand>

Next, a hardware configuration example of a pen drawing system that implements the calibration by cooperative processing between a pen and a pen stand will be described with reference to FIG. 26.

Note that, in FIG. 26, configurations of the PC 33 and the display device 34 are similar to the configurations described with reference to FIG. 10, and thus the description thereof is omitted.

The pen 331 includes a control unit 351, an acquisition unit 352, a communication unit 353, a multi-IMU 354, a light emitting unit 355, and a pressure-sensitive sensor 356, which are electrically connected by a bus 361 and can communicate with each other.

Note that the control unit 351, the acquisition unit 352, the communication unit 353, the multi-IMU 354, the light emitting unit 355, and the pressure-sensitive sensor 356 basically have similar configurations to those of the control unit 101, the acquisition unit 102, the communication unit 103, the multi-IMU 63, the light emitting unit 52, and the pressure-sensitive sensor 51 in FIG. 10, and thus the description thereof is omitted.

However, the acquisition unit 352 acquires and holds in advance information of an azimuth difference between a latitude input by the user 21 operating a keyboard or the like and the pen stand 301. Furthermore, the acquisition unit 352 controls the communication unit 353 to communicate with the pen stand 301 to acquire information of the absolute azimuth, and the control unit 351 performs the calibration using these pieces of information. In these respects, the control unit 351 and the acquisition unit 352 are different from the control unit 101 and the acquisition unit 102 in FIG. 10.

The pen stand 301 includes a control unit 381, a communication unit 382, and a multi-IMU 383, which are electrically connected by a bus 391 and can communicate with each other.

Note that the communication unit 382 and the multi-IMU 383 basically have similar configurations to those of the communication unit 103 of the pen 31 and the multi-IMU 63, and thus the description thereof is omitted.

The basic configuration of the control unit 381 is similar to that of the control unit 101 of the pen 31, but is different in that the control unit obtains the absolute azimuth of the pen stand 301 on the basis of detection results of the multi-IMU 383 in two types of stationary attitudes, controls the communication unit 382, and transmits the absolute azimuth to the communication unit 353 of the pen 331.

Figure 26:
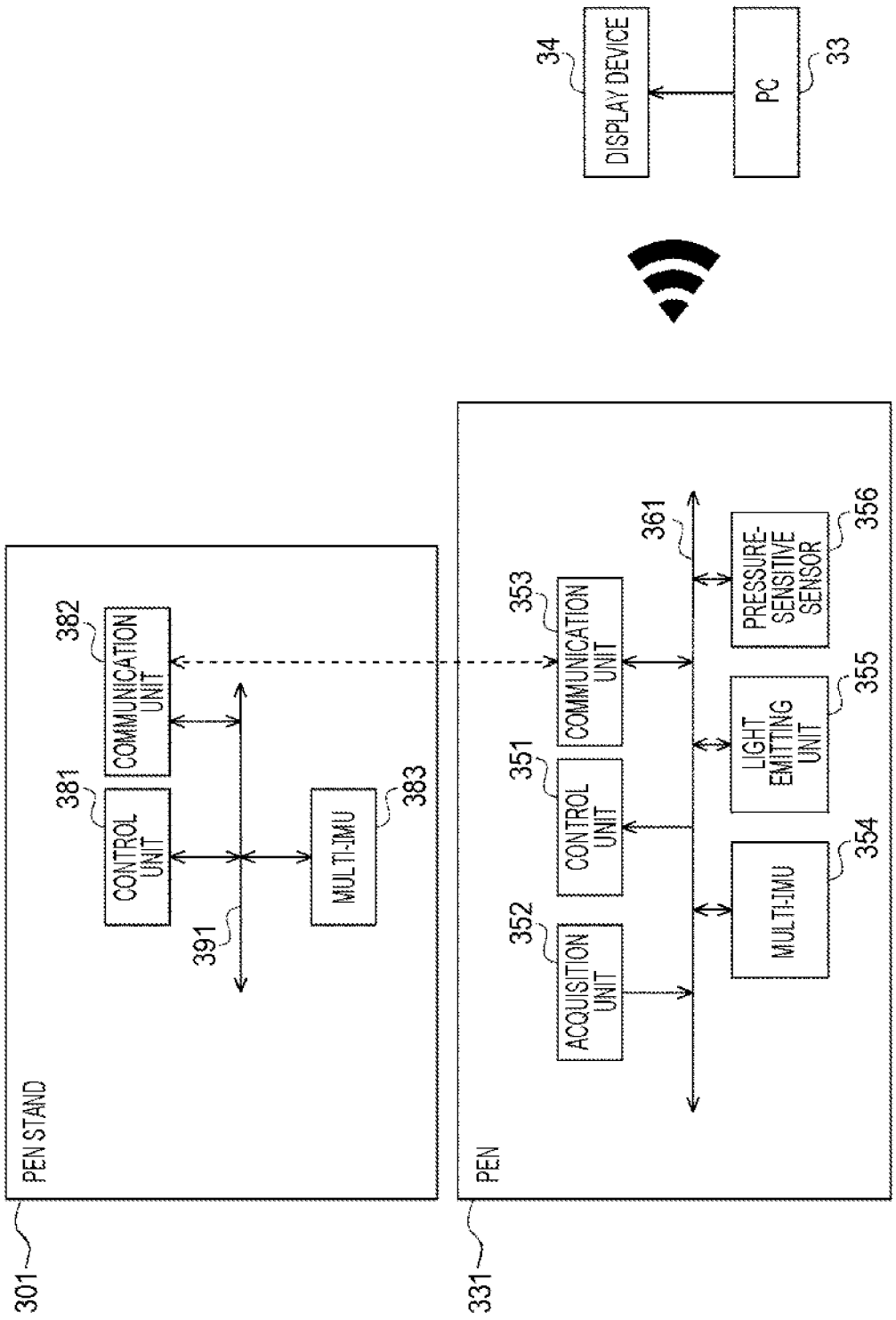
FIG. 26 is a diagram describing a hardware configuration example of the pen and the pen stand in an application example of the pen drawing system.

<Function Implemented by Control Unit of Pen Stand in FIG. 26>

Figure 27:
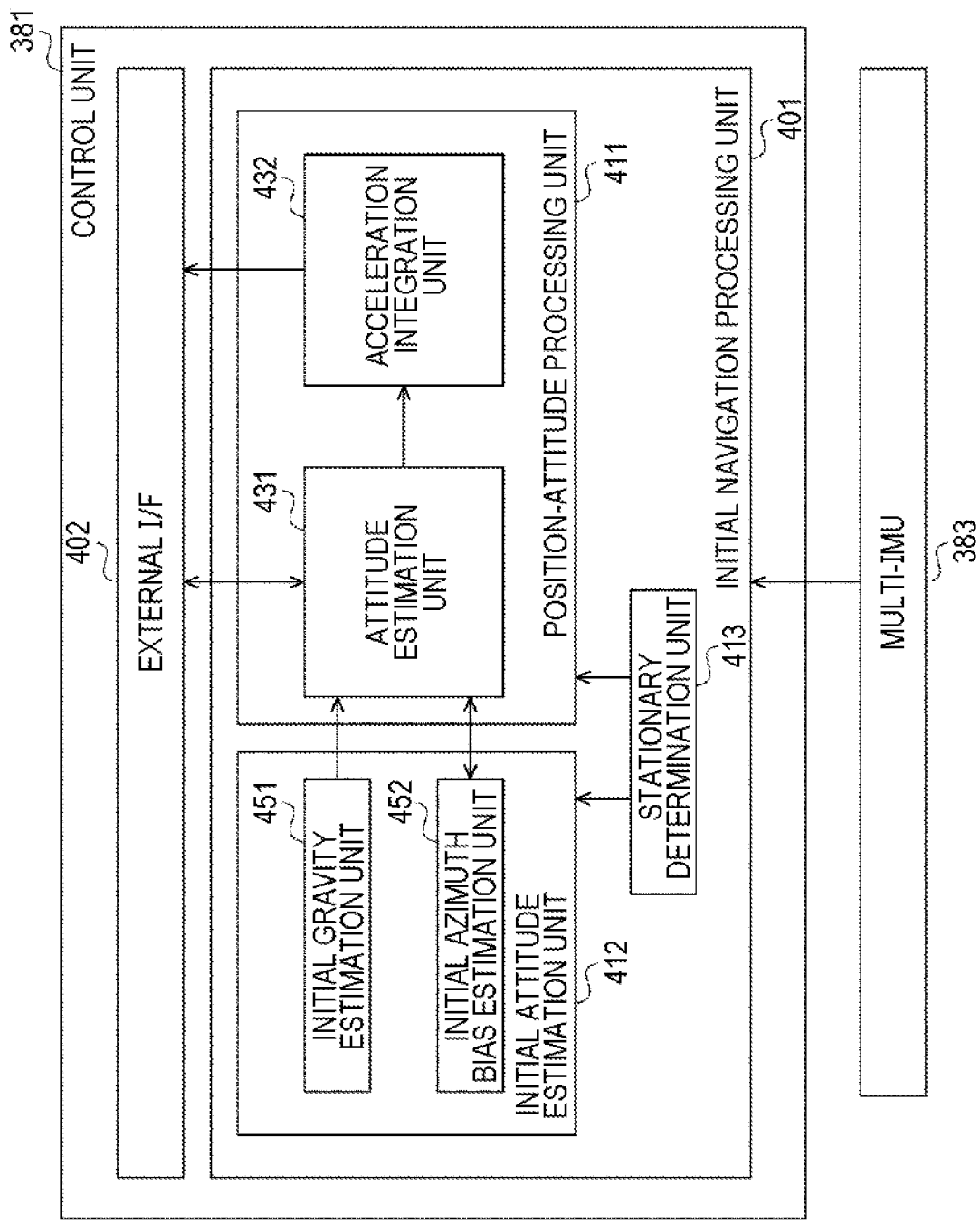
FIG. 27 is a diagram describing functions implemented by a control unit of the pen stand.

Next, a function implemented by the control unit 381 of the pen stand 301 of FIG. 26 will be described with reference to FIG. 27.

The control unit 381 includes an inertial navigation processing unit 401 and an external I/F 402. Note that the inertial navigation processing unit 401 and the external I/F 402 are basically the same as the inertial navigation processing unit 131 and the external I/F 134 in FIG. 11, but are different in that the processing on the light emission control unit 132 and the pressure-sensitive sensor processing unit 133 is not performed.

Furthermore, the inertial navigation processing unit 131 of FIG. 11 is different in that the information of the absolute azimuth and the latitude is acquired by the acquisition unit 102, and the calibration is performed on the basis of a detection result supplied from the multi-IMU 63 in one type of stationary attitude, whereas the inertial navigation processing unit 401 is only given the information of the latitude and obtains the absolute azimuth on the basis of detection results supplied from the multi-IMU 383 in the two types of stationary attitudes.

More specifically, the inertial navigation processing unit 401 includes a position-attitude processing unit 411, an initial attitude estimation unit 412, and a stationary determination unit 413.

Figure 12:
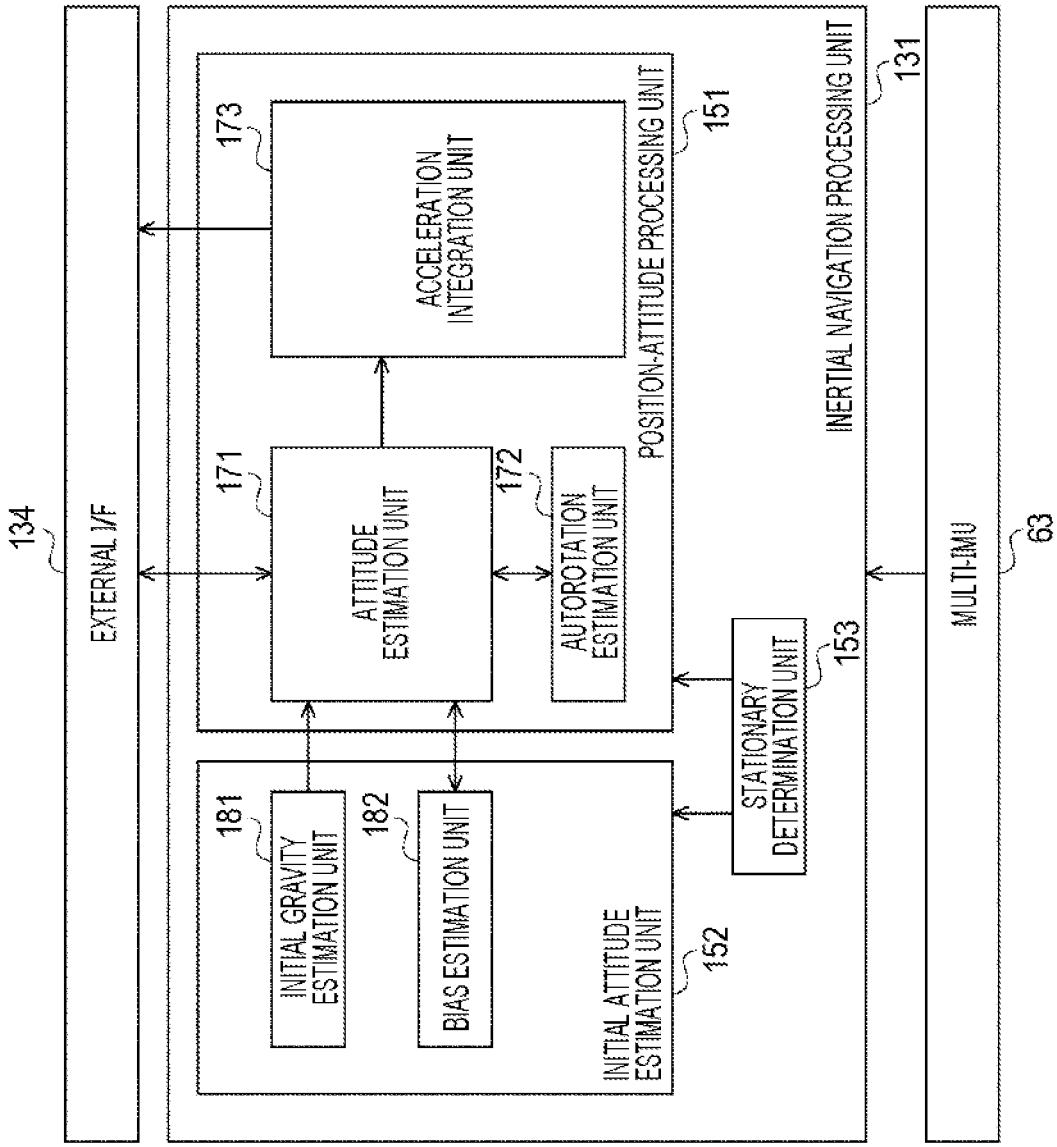
FIG. 12 is a diagram describing functions implemented by an inertial navigation processing unit in FIG. 11.

The position-attitude processing unit 411, the initial attitude estimation unit 412, and the stationary determination unit 413 basically have functions similar to those of the position-attitude processing unit 151, the initial attitude estimation unit 152, and the stationary determination unit 153 in FIG. 12.

However, since the absolute azimuth is not given, the initial attitude estimation unit 412 obtains the absolute azimuth and the bias component on the basis of the detection results detected by the multi-IMU 383 in the two types of stationary attitudes, and supplies the absolute azimuth and the bias component to the position-attitude processing unit 411.

Processing of the calibration performed by the position-attitude processing unit 411 on the basis of the information of the absolute azimuth supplied by the initial attitude estimation unit 412 and the latitude supplied by the external I/F 402 is similar to that of the position-attitude processing unit 151 in FIG. 12.

More specifically, the position-attitude processing unit 411 includes an attitude estimation unit 431 and an acceleration integration unit 432.

Note that the attitude estimation unit 431 and the acceleration integration unit 432 have the same functions as the attitude estimation unit 171 and the acceleration integration unit 173 in FIG. 12, and thus the description thereof is omitted.

However, because the autorotation component is obtained by the initial attitude estimation unit 412, there is no configuration corresponding to the autorotation estimation unit 172 in FIG. 12, and thus the processing for the autorotation component is omitted in the processing in the attitude estimation unit 431.

The initial attitude estimation unit 412 includes an initial gravity estimation unit 451 and an initial azimuth bias estimation unit 452.

Note that the initial gravity estimation unit 451 is similar to the initial gravity estimation unit 181 in FIG. 12, and thus the description thereof is omitted.

The initial azimuth bias estimation unit 452 obtains the autorotation component and the bias component on the basis of the detection results of the multi-IMU 383 in the two types of stationary attitudes, further obtains the initial azimuth from the autorotation component, and supplies the initial azimuth to the attitude estimation unit 431 of the position-attitude processing unit 411.

Note that a method for obtaining the autorotation component and the bias component and a method for obtaining the initial azimuth from the autorotation component based on the detection results of the multi-IMU 383 in the two types of stationary attitudes are general processing, and thus the description thereof is omitted.

<Cooperative Processing Between Pen and Pen Stand>

Next, the cooperative processing between the pen 331 and the pen stand 301 will be described with reference to a flowchart of FIG. 28.

Note that, here, in the pen stand 301, processing for only supplying the absolute azimuth to the pen 331 is described and processing of obtaining the attitude in the pen stand 301 is omitted, but processing of obtaining the own attitude is also performed as in the pen 31.

In step S211, the initial azimuth bias estimation unit 452 of the initial attitude estimation unit 412 calculates the bias component and the autorotation component on the basis of the acceleration and the angular velocity detected by the multi-IMU 383 in the two types of stationary attitudes, calculates the absolute azimuth on the basis of the autorotation component, and supplies information of the absolute azimuth to the attitude estimation unit 431 of the position-attitude processing unit 411.

In step S212, the attitude estimation unit 431 determines whether or not information of the absolute azimuth has been supplied from the initial azimuth bias estimation unit 452.

In step S212, the processing in steps S211 and S212 is repeated until it is assumed that the information of the absolute azimuth has been supplied from the initial azimuth bias estimation unit 452.

Then, in a case where it is determined in step S212 that the information of the absolute azimuth has been supplied from the initial azimuth bias estimation unit 452, the processing proceeds to step S213.

In step S213, the attitude estimation unit 431 stores the information of the absolute azimuth acquired from the initial azimuth bias estimation unit 452.

In step S214, the attitude estimation unit 431 controls the communication unit 382 to transmit the information of the absolute azimuth to the pen 331 via the external I/F 402.

By the processing so far, information of initial absolute azimuth is transmitted to the pen 331.

In step S215, the attitude estimation unit 431 controls the stationary determination unit 413 to determine whether or not it is stationary on the basis of the acceleration and the angular velocity detected by the multi-IMU 383, and determines whether it is not stationary, that is, whether or not the pen stand 301 is moved, rotated, or the like.

In a case where it is determined in step S215 that the pen stand 301 is not stationary and has been moved, rotated, or the like, the processing proceeds to step S216.

In step S216, the attitude estimation unit 431 supplies the stored information of the absolute azimuth to the acceleration integration unit 432 for being updated on the basis of an integration result of the acceleration, and then acquires and stores the information.

In step S217, the attitude estimation unit 431 controls the communication unit 382 to transmit the updated information of the absolute azimuth to the pen 331 via the external I/F 402.

Note that, in a case where it is determined in step S215 that it is stationary, the processing in steps S216 and S217 is skipped.

In step S218, the attitude estimation unit 431 determines whether or not the end of the processing has been instructed, and in a case where the end has not been instructed, the processing returns to step S215.

That is, the processing in steps S215 to S218 is repeated until the end of the processing is instructed, and when the pen stand 301 is moved or rotated, the absolute attitude is updated and transmitted to the pen 331.

On the other hand, in the pen 331, in step S231, the control unit 351 of the pen 331 controls the acquisition unit 352 to acquire information of the latitude and the azimuth difference.

In step S232, the control unit 351 controls the communication unit 353 to determine whether or not the absolute azimuth has been transmitted from the pen stand 301.

In step S232, in a case where the absolute azimuth is transmitted from the pen stand 301 by the processing in step S214 or S217 described above, the processing proceeds to step S233.

In step S233, the control unit 351 controls the communication unit 353 to acquire and store the information of the absolute azimuth transmitted from the pen stand 301.

In step S234, the control unit 351 subtracts the azimuth difference from the acquired absolute azimuth of the pen stand 301 as a correction to the absolute azimuth of the pen 331.

Figure 15:
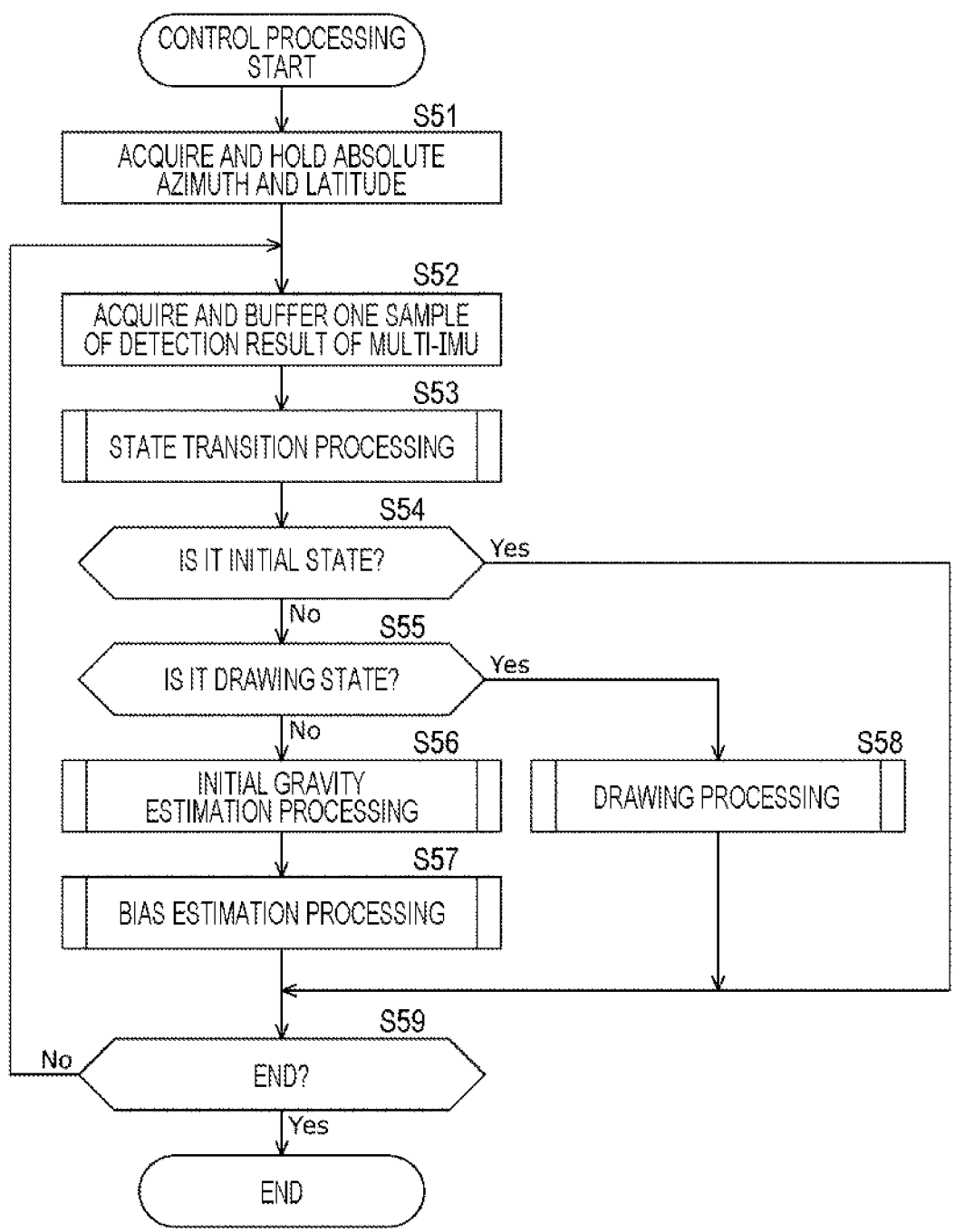
FIG. 15 is a flowchart describing control processing by the pen in FIG. 11.

Thereafter, the control processing described with reference to the flowchart of FIG. 15 is performed using the information of the absolute azimuth of the pen 331 obtained by correcting the updated new absolute azimuth of the pen stand 301 with a difference azimuth. However, in this case, the processing is performed by replacing the absolute azimuth acquired in the processing of step S51 in FIG. 15 with the absolute difference obtained by correcting the absolute azimuth supplied from the pen stand 301 with the azimuth difference.

In step S235, the control unit 351 determines whether or not the end of the processing has been instructed, and in a case where the end has not been instructed, the processing returns to step S232.

Then, in a case where the end has been instructed in step S235, the processing ends.

As described above, since the calibration is performed by the cooperative processing between the pen 331 and the pen stand 301, the control processing by the pen 331 is performed on the basis of the absolute azimuth supplied from the pen stand 301, and thus the user does not need to supply information of the absolute azimuth.

Furthermore, since the information of the absolute azimuth is kept updated every time the pen stand 301 is moved or rotated, the user can freely change the position and direction of the pen stand 301 without being conscious of the calibration.

Moreover, in the above description, the example has been described in which the update of the absolute azimuth performed every time the pen stand 301 is moved or rotated is updated with the integrated value by the acceleration integration unit 432, but the absolute azimuth may be updated by repeatedly executing the processing in steps S211 to S214.

<Modification Example of Cooperative Processing Between Pen and Pen Stand>

In the above description, the example has been described in which the absolute azimuth is transmitted to the pen 331 every time the absolute azimuth is obtained in the pen stand 301, but the absolute azimuth may be transmitted to the pen 331 when the pen 331 is placed upright on the pen stand 301.

Accordingly, a modification example of the cooperative processing between the pen 331 and the pen stand 301 in which the absolute azimuth is transmitted to the pen 331 when the pen 331 is placed upright on the pen stand 301 will be described with reference to a flowchart of FIG. 29.

Figure 28:
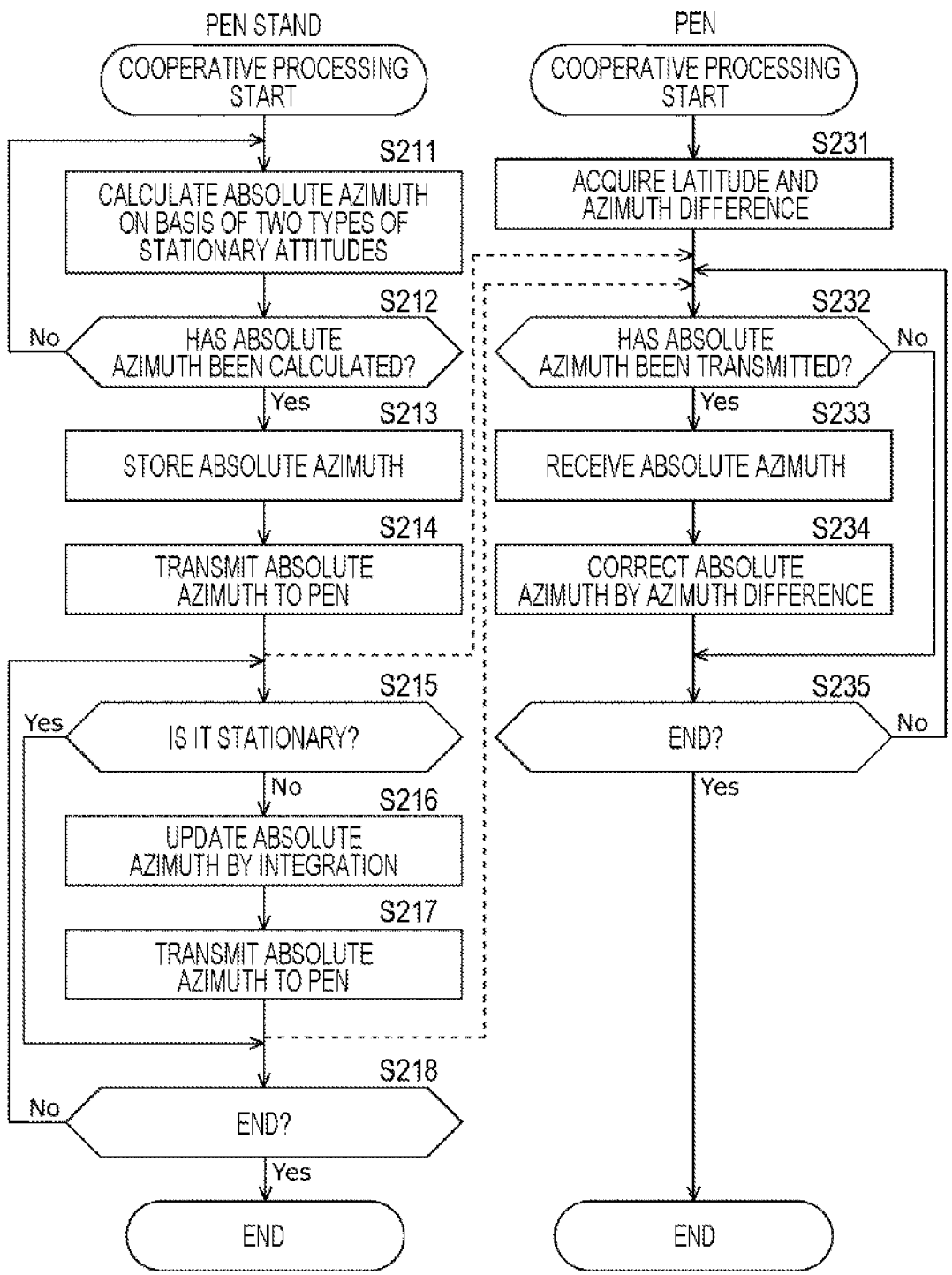
FIG. 28 is a flowchart describing cooperative processing between the pen and the pen stand.
Figure 29:
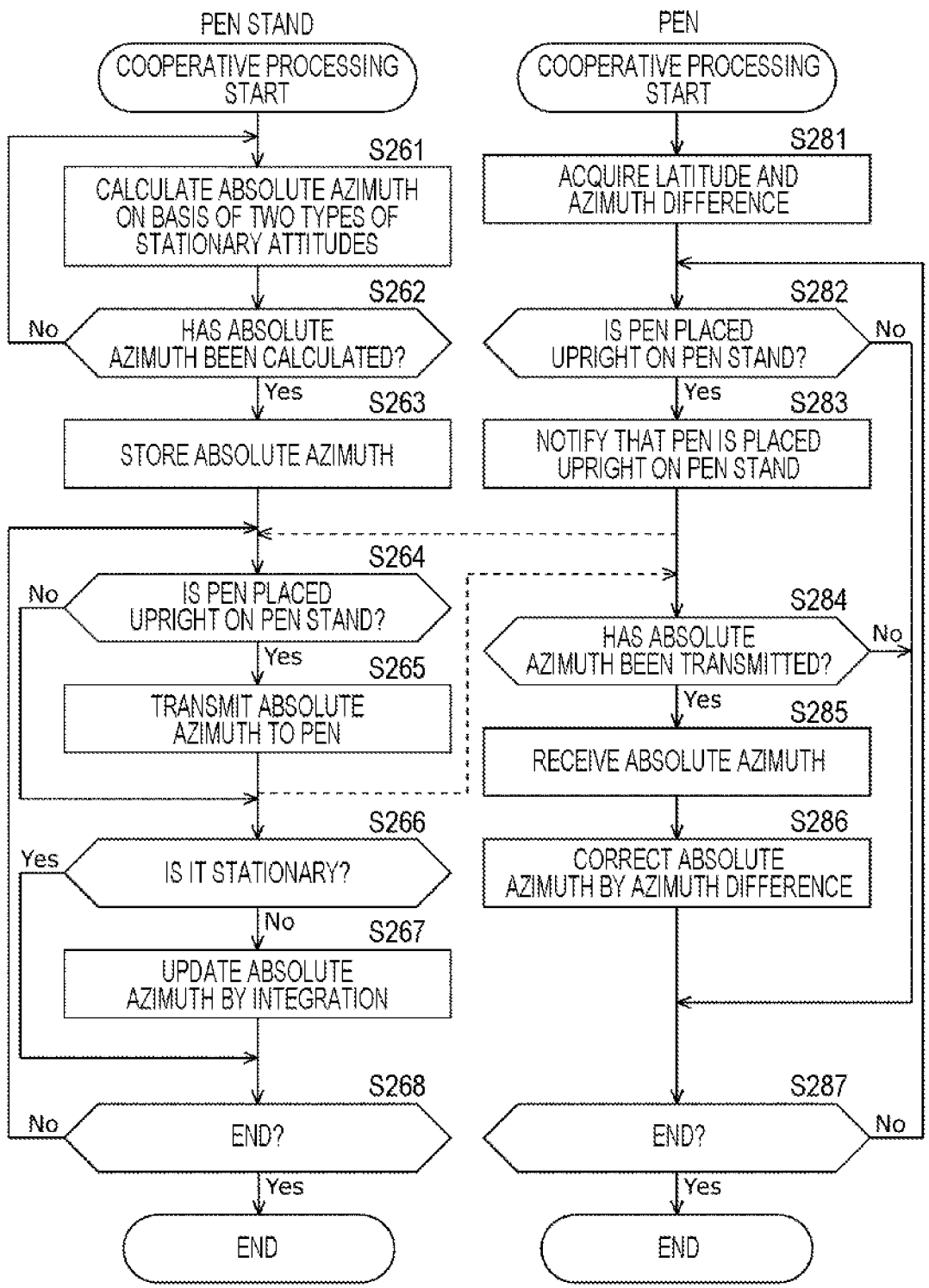
FIG. 29 is a flowchart describing a modification example of the cooperative processing between the pen and the pen stand.

Note that the processing in steps S261 to S263 in the flowchart of FIG. 29 is similar to the processing in steps S211 to S213 in the flowchart of FIG. 28, and thus the description thereof is omitted.

When the absolute azimuth is obtained by the processing in steps SS261 to S263, the processing proceeds to step S264.

In step S264, the attitude estimation unit 431 controls the communication unit 382 to determine whether or not the pen 331 has notified that it is placed upright on the pen stand 301, and when the pen 331 has notified that it is placed upright on the pen stand 301, the processing proceeds to step S265.

In step S265, the attitude estimation unit 431 controls the communication unit 382 to transmit information of the absolute azimuth to the pen 331 via the external I/F 402.

In step S266, the attitude estimation unit 431 controls the stationary determination unit 413 to determine whether or not it is stationary on the basis of the acceleration and the angular velocity detected by the multi-IMU 383, and determines whether it is not stationary, that is, whether or not the pen stand 301 is moved, rotated, or the like.

In a case where it is determined in step S266 that the pen stand 301 is not stationary and has been moved, rotated, or the like, the processing proceeds to step S267.

In step S267, the attitude estimation unit 431 supplies the stored information of the absolute azimuth to the acceleration integration unit, and causes the acceleration integration unit 432 to update, acquire, and store the information of the absolute azimuth on the basis of the integration result of the acceleration.

Note that, in a case where it is determined in step S266 that it is stationary, the processing in step S267 is skipped.

In step S268, the attitude estimation unit 431 determines whether or not the end of the processing has been instructed, and in a case where the end has not been instructed, the processing returns to step S264.

That is, the processing in steps S264 to S268 is repeated until the end of the processing is instructed, and when the pen stand 301 is moved or rotated, the absolute azimuth is updated. Then, when the pen 331 notifies that it is placed upright on the pen stand 301, the absolute azimuth is transmitted from the pen stand 301 to the pen 331.

On the other hand, in the pen 331, in step S281, the control unit 351 of the pen 331 controls the acquisition unit 352 to acquire information of the latitude and the azimuth difference.

In step S282, the control unit 351 determines whether or not it is stationary, that is, the pen 331 is placed upright on the pen stand 301 and is stationary on the basis of the acceleration and the angular velocity detected by the multi-IMU 354.

In a case where it is determined in step S282 that the pen 331 is stationary, that is, the pen 331 is placed upright on the pen stand 301 and is stationary, the processing proceeds to step S283.

In step S283, the control unit 351 controls the communication unit 353 to notify the pen stand 301 that it is placed upright on the pen stand 301.

In step S284, the control unit 351 controls the communication unit 353 to determine whether or not the absolute azimuth has been transmitted from the pen stand 301.

That is, by the processing in step S283, it is determined in step S264 that the pen 331 has been placed upright on the pen stand 301, and the absolute azimuth is transmitted by the processing in step S265.

Accordingly, in step S284, since the absolute azimuth is transmitted from the pen stand 301, the processing proceeds to step S285.

In step S285, the control unit 351 controls the communication unit 353 to acquire and store the information of the absolute azimuth transmitted from the pen stand 301.

In step S286, the control unit 351 subtracts the azimuth difference from the acquired absolute azimuth of the pen stand 301 as a correction to the absolute azimuth of the pen 331.

Thereafter, the control processing described with reference to the flowchart of FIG. 15 is performed using the information of the absolute azimuth of the pen 331 obtained by correcting the updated new absolute azimuth of the pen stand 301 with a difference azimuth. However, in this case, the processing is performed by replacing the absolute azimuth acquired in the processing of step S51 in FIG. 15 with the absolute difference obtained by correcting the absolute azimuth supplied from the pen stand 301 with the azimuth difference.

In step S287, the control unit 351 determines whether or not the end of the processing has been instructed, and in a case where the end has not been instructed, the processing returns to step S282.

Then, in a case where the end has been instructed in step S287, the processing ends.

Note that, in a case where it is determined in step S282 that it is not stationary and the pen 331 is not placed upright on the pen stand 301, or in a case where the absolute azimuth has not been transmitted in step S284, the processing proceeds to step S287.

With the above processing, the control processing by the pen 331 is performed on the basis of the absolute azimuth supplied from the pen stand 301, and thus the user does not need to supply information of the absolute azimuth.

Furthermore, since the absolute azimuth is transmitted from the pen stand 301 to the pen 331 every time the pen 331 is placed upright on the pen stand 301, even if the information of the absolute azimuth is updated every time the pen stand 301 is moved or rotated, the absolute azimuth is not transmitted until the pen 331 is placed upright on the pen 331, and is transmitted only when the pen 331 is placed upright.

Moreover, in the above description, an example has been described in which the update of the absolute azimuth performed every time the pen stand 301 is moved or rotated is updated by the integrated value by the acceleration integration unit 432, but the processing in steps S261 to S263 may be repeatedly performed.

3. Example Executed by Software

Figure 30:
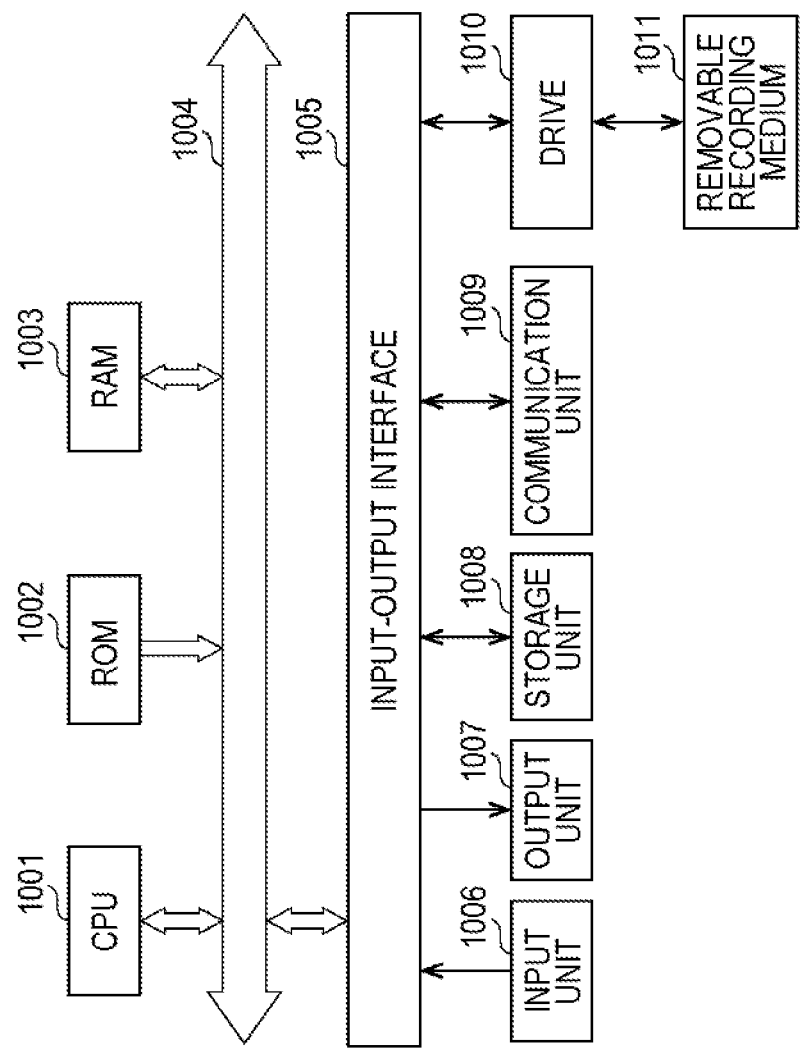
FIG. 30 is a diagram illustrating a configuration example of a general-purpose personal computer.

FIG. 30 illustrates a configuration example of a general-purpose computer. This personal computer includes a central processing unit (CPU) 1001. An input-output interface 1005 is connected to the CPU 1001 via a bus 1004. A read only memory (ROM) 1002 and a random access memory (RAM) 1003 are connected to the bus 1004.

To the input-output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and executes a communication process via a network represented by the Internet are connected. Furthermore, a drive 1010 that reads and writes data from and to a removable storage medium 1011 such as a magnetic disk (including a flexible disk), an optical disk (including a compact disc-read only memory (CD-ROM), a digital versatile disc (DVD)), a magneto-optical disk (including a Mini Disc (MD)), or a semiconductor memory is connected.

The CPU 1001 executes various processes according to a program stored in the ROM 1002 or a program read from a removable storage medium 1011 such as a magnetic disk, an optical disk, a magneto-optical disk, or a semiconductor memory, installed in the storage unit 1008, and loaded from the storage unit 1008 to the RAM 1003. The RAM 1003 also appropriately stores data necessary for the CPU 1001 to execute various processes, and the like.

In the computer configured as described above, for example, the CPU 1001 loads the program stored in the storage unit 1008 into the RAM 1003 via the input-output interface 1005 and the bus 1004 and executes the program, to thereby perform the above-described series of processes.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable storage medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program for processing in time series in the order described in the present description, or a program for processing in parallel or at a necessary timing such as when a call is made.

Note that the CPU 1001 in FIG. 30 implements the functions of the control unit 101 in FIG. 10 and the control unit 351, 381 in FIG. 25.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that embodiments of the present disclosure are not limited to the above-described embodiments, and various modifications are possible without departing from the scope of the present disclosure.

For example, the present disclosure can have a configuration of cloud computing in which one function is shared by a plurality of devices via a network and processing is performed in cooperation.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

Note that the present disclosure can also have the following configurations.

<1> An information processing device including
a control unit that calibrates an inertial measurement unit on the basis of a stationary attitude measurement value that is a measurement value detected by the inertial measurement unit and information related to an arrangement of the inertial measurement unit in one stationary attitude.

<2> The information processing device according to <1>, in which
the control unit calibrates the inertial measurement unit on the basis of the stationary attitude measurement value and information of a latitude and an absolute direction on earth of the inertial measurement unit.

<3> The information processing device according to <2>, in which
the control unit calibrates the inertial measurement unit by calculating a component related to autorotation of the earth in an angular velocity of the stationary attitude measurement value as an autorotation component of a sensor coordinate system with reference to the inertial measurement unit on the basis of the information of the latitude and the absolute direction.

<4> The information processing device according to <3>, in which
the control unit calibrates the inertial measurement unit by calculating a gravity direction from information of acceleration in the stationary attitude measurement value, calculating the autorotation component of the sensor coordinate system on the basis of the gravity direction and the absolute direction.

<5> The information processing device according to <4>, in which
the control unit sets an inverse matrix of an attitude rotation matrix for conversion of attitude information in a global coordinate system into attitude information in a sensor coordinate system with reference to the inertial measurement unit on the basis of the gravity direction and the absolute direction, and calibrates the inertial measurement unit by converting an autorotation component of the global coordinate system based on the information of the latitude and the absolute direction into the autorotation component of the sensor coordinate system by the inverse matrix.

<6> The information processing device according to <5>, in which the control unit calibrates the inertial measurement unit by calculating a bias component of the sensor coordinate system from the stationary attitude measurement value on the basis of the stationary attitude measurement value and the autorotation component of the sensor coordinate system.

<7> The information processing device according to <6>, in which the control unit calibrates the inertial measurement unit by calculating the bias component of the sensor coordinate system by subtracting the autorotation component of the sensor coordinate system from an average value of angular velocities in the stationary attitude measurement value.

<8> The information processing device according to <7>, in which the control unit corrects a measurement value measured by the inertial measurement unit on the basis of the autorotation component and the bias component obtained by the calibration.

<9> The information processing device according to <8>, in which the control unit corrects the measurement value by subtracting the autorotation component and the bias component from the measurement value measured by the inertial measurement unit.

<10> The information processing device according to <9>, in which the control unit updates the attitude rotation matrix on the basis of an angular velocity of the measurement value corrected by subtracting the autorotation component and the bias component, and converts an acceleration of the measurement value into an acceleration of the global coordinate system by the attitude rotation matrix updated.

<11> The information processing device according to <10>, in which the inertial measurement unit is incorporated in a pen-type device that is moved according to a shape desired by a user, and the control unit obtains position information of a track of a tip of the pen-type device on the basis of the acceleration of the global coordinate system, and displays a drawn image corresponding to the track on a display device that displays an image on the basis of the position information of the track.

<12> The information processing device according to <11>, further including a pen stand including a hole capable of fixing the pen-type device by inserting the pen-type device in the hole in a predetermined direction, in which the one stationary attitude is an attitude in a state where the pen-type device is inserted in and fixed to the pen stand.

<13> The information processing device according to <12>, in which a cross-sectional shape of the pen-type device and a cross-sectional shape of the hole of the pen stand match each other in a predetermined direction, and the one stationary attitude is an attitude in a state where the pen-type device is inserted in a state where the cross-sectional shape of the pen-shaped device and the cross-sectional shape of the hole of the pen stand match each other.

<14> The information processing device according to <12> or <13>, in which the pen-type device includes a light emitting unit whose light emission is controlled by the control unit, and the control unit causes the light emitting unit to emit light when the autorotation component and the bias component are obtained by the calibration in the one stationary attitude in which the pen-type device is inserted in the pen stand.

<15> The information processing device according to <14>, in which after the autorotation component and the bias component are obtained by the calibration and the light emitter is caused to emit light, when the pen-type device is pulled out from the pen stand and moved according to a shape desired by the user to obtain position information of the track of the tip of the pen-type device on the basis of the acceleration of the global coordinate system, the control unit turns off the light emitting unit when a predetermined time has elapsed from a timing at which the pen-type device is pulled out from the pen stand.

<16> The information processing device according to <15>, in which when the pen-type device is pulled out from the pen stand and moved according to the shape desired by the user to obtain the position information of the track of the tip of the pen on the basis of the acceleration of the global coordinate system, the control unit causes the drawn image corresponding to the track displayed on the display device to be displayed in a gradually lighter color on the basis of the position information of the track along with an elapsed time from a timing at which the pen is pulled out from the pen stand.

<17> The information processing device according to <15>, in which the pen stand includes the inertial measurement unit, detects an absolute azimuth of the pen stand, and supplies the absolute azimuth to the pen-type device, and the control unit acquires the absolute azimuth of the pen stand and calibrates the inertial measurement unit on the basis of the absolute azimuth of the pen stand, information of the latitude on the earth of the inertial measurement unit, and the stationary attitude measurement value.

<18> The information processing device according to <17>, in which the control unit acquires information of a difference azimuth between the pen stand and the control unit itself, acquires an absolute azimuth of the pen stand, obtains an absolute azimuth of the control unit itself from the absolute azimuth of the pen stand and the difference azimuth, and calibrates the inertial measurement unit on the basis of the absolute azimuth of the control unit itself, the information of the latitude on the earth of the inertial measurement unit, and the stationary attitude measurement value.

<19> An information processing method including calibrating an inertial measurement unit on the basis of a stationary attitude measurement value that is a measurement value detected by the inertial measurement unit and information related to an arrangement of the inertial measurement unit in one stationary attitude.

<20> A program for causing a computer to function as a control unit that calibrates an inertial measurement unit on the basis of a stationary attitude measurement value that is a measurement value detected by the inertial measurement unit and information related to an arrangement of the inertial measurement unit in one stationary attitude.

REFERENCE SIGNS LIST

11 Pen drawing system
31, 31', 31", 31''' Pen
32, 32', 32", 32''' Pen stand
32a, 32a', 32a", 32a''' Hole
33 PC
34 Display device
51 Pressure-sensitive sensor
52 Light emitting unit
61 Substrate
62 Battery
63 Multi-IMU (Inertial Measurement Unit)
63a to 63d IMU
81 Liquid
82, 83 O-ring
84 Cover
84 Recess
85 Outer peripheral part
86 Inner diameter part
101 Control unit
102 Acquisition unit
103 Communication unit
131 Inertial navigation processing unit
132 Light emission control unit
133 Pressure-sensitive sensor processing unit
134 External I/F
141 Control IC
142 LED
151 Position-attitude processing unit
152 Initial attitude estimation unit
153 Stationary determination unit
171 Attitude estimation unit
172 Autorotation estimation unit
173 Acceleration integration unit
181 Initial gravity estimation unit
182 Bias estimation unit
201 Pen stand
211 Changeover switch
212 Light emitting unit
212a to 212c LED
301, 301' Light emitting unit
331 Pen
331a Pressure-sensitive sensor
351 Control unit
352 Acquisition unit
353 Communication unit
354 Multi-IMU
355 Light emitting unit
356 Pressure-sensitive sensor
381 Control unit
382 Communication unit
383 Multi-IMU
411 Position-attitude estimation unit
412 Initial attitude estimation unit
413 Stationary determination unit
431 Attitude estimation unit
432 Acceleration integration unit
451 Initial gravity estimation unit
452 Absolute azimuth bias estimation unit

The invention claimed is:

1. An information processing device, comprising circuitry configured to detect a stationary attitude measurement value; and
a central processing unit (CPU) configured to:
calculate a gravity direction from information of acceleration in the stationary attitude measurement value;
calculate a component related to autorotation of earth in an angular velocity of the stationary attitude measurement value as an autorotation component of a sensor coordinate system with reference to the circuitry based on the gravity direction, absolute direction, and information of latitude;
calibrate the circuitry based on:
the stationary attitude measurement value that is a measurement value detected by the circuitry and information related to an arrangement of the circuitry in a stationary attitude, and
the autorotation component of the sensor coordinate system with reference to the circuitry.

2. The information processing device according to claim 1, wherein the CPU is further configured to:
set an inverse matrix of an attitude rotation matrix for conversion of attitude information in a global coordinate system into attitude information in the sensor coordinate system with reference to the circuitry based on the gravity direction and the absolute direction; and
calibrate the circuitry by conversion of an autorotation component of the global coordinate system based on the information of the latitude and the absolute direction into the autorotation component of the sensor coordinate system by the inverse matrix.

3. The information processing device according to claim 2, wherein the CPU is further configured to calibrate the circuitry by calculation of a bias component of the sensor coordinate system from the stationary attitude measurement value based on the stationary attitude measurement value and the autorotation component of the sensor coordinate system.

4. The information processing device according to claim 3, wherein
the CPU is further configured to calibrate the circuitry by the calculation of the bias component of the sensor coordinate system by subtracting the autorotation component of the sensor coordinate system from an average value of angular velocities in the stationary attitude measurement value, and
the angular velocities include the angular velocity.

5. The information processing device according to claim 4, wherein the CPU is further configured to correct the stationary attitude measurement value based on the autorotation component of the sensor coordinate system and the bias component of the sensor coordinate system obtained by the calibration.

6. The information processing device according to claim 5, wherein the CPU is further configured to correct the stationary attitude measurement value by subtracting the autorotation component of the sensor coordinate system and the bias component of the sensor coordinate system from the stationary attitude measurement value.

7. The information processing device according to claim 6, wherein the CPU is further configured to:
   update the attitude rotation matrix based on the angular velocity of the corrected stationary attitude measurement value; and
   convert the acceleration of the stationary attitude measurement value into an acceleration of the global coordinate system by the updated attitude rotation matrix.

8. The information processing device according to claim 7, wherein
   the circuitry is incorporated in a pen-type device that is moved based on a shape desired by a user, and
   the CPU is further configured to:
      obtain position information of a track of a tip of the pen-type device based on the acceleration of the global coordinate system; and
      display a drawn image corresponding to the track on a display device that displays an image based on the position information of the track.

9. The information processing device according to claim 8, further comprising a pen stand that includes a hole in which the pen-type device is fixed by insertion of the pen-type device in the hole in a specific direction, wherein
   the stationary attitude is an attitude in a state where the pen-type device is inserted in and fixed to the pen stand.

10. The information processing device according to claim 9, wherein
   a cross-sectional shape of the pen-type device and a cross-sectional shape of the hole of the pen stand match each other in the specific direction, and
   the stationary attitude is the attitude in the state where the pen-type device is inserted in a state where the cross-sectional shape of the pen-type device and the cross-sectional shape of the hole of the pen stand match each other.

11. The information processing device according to claim 9, wherein the CPU is further configured to:
   control light emission of a light emitting diode (LED) of the pen-type device; and
   control the LED to emit light when the autorotation component of the sensor coordinate system and the bias component of the sensor coordinate system are obtained by the calibration in the stationary attitude in which the pen-type device is inserted in the pen stand.

12. The information processing device according to claim 11, wherein after the autorotation component of the sensor coordinate system and the bias component of the sensor coordinate system are obtained by the calibration and the LED emits light, when the pen-type device is pulled out from the pen stand and moved based on the shape desired by the user to obtain the position information of the track of the tip of the pen-type device based on the acceleration of the global coordinate system, the CPU is further configured to turn off the LED when a specific time has elapsed from a timing at which the pen-type device is pulled out from the pen stand.

13. The information processing device according to claim 12, wherein when the pen-type device is pulled out from the pen stand and moved based on the shape desired by the user to obtain the position information of the track of the tip of the pen based on the acceleration of the global coordinate system, the CPU is further configured to display the drawn image corresponding to the track displayed on the display device to be displayed in a gradually lighter color based on the position information of the track along with the specific elapsed time.

14. The information processing device according to claim 12, wherein
   the pen stand includes the circuitry,
   the pen stand detects an absolute azimuth of the pen stand, and
   the pen stand supplies the absolute azimuth of the pen stand to the pen-type device, and
   the CPU is further configured to:
      acquire the absolute azimuth of the pen stand; and
      calibrate the circuitry based on the absolute azimuth of the pen stand, the information of the latitude on the earth of the circuitry, and the stationary attitude measurement value.

15. The information processing device according to claim 14, wherein the CPU is further configured to:
   acquire information of a difference azimuth between the pen stand and the CPU;
   acquire an absolute azimuth of the CPU from the absolute azimuth of the pen stand and the difference azimuth; and
   calibrate the circuitry based on the absolute azimuth of the CPU, the information of the latitude on the earth of the circuitry, and the stationary attitude measurement value.

16. An information processing method, comprising:
   detecting, by a circuitry, a stationary attitude measurement value;
   calculating, by a central processing unit (CPU), a gravity direction from information of acceleration in the stationary attitude measurement value;
   calculating, by the CPU, a component related to autorotation of earth in an angular velocity of the stationary attitude measurement value as an autorotation component of a sensor coordinate system with reference to the circuitry based on the gravity direction, absolute direction, and information of latitude;
   calibrating, by the CPU, the circuitry based on:
      the stationary attitude measurement value that is a measurement value detected by the circuitry and information related to an arrangement of the circuitry in a stationary attitude, and
      the autorotation component of the sensor coordinate system with reference to the circuitry.

17. A non-transitory computer-readable medium having stored thereon, computer-executable instructions which, when executed by a processor of an information processing device, cause the processor to execute operations, the operations comprising:
   detecting, by a circuitry, a stationary attitude measurement value;
   calculating, by a central processing unit (CPU), a gravity direction from information of acceleration in the stationary attitude measurement value;
   calculating, by the CPU, a component related to autorotation of earth in an angular velocity of the stationary attitude measurement value as an autorotation component of a sensor coordinate system with reference to the circuitry based on the gravity direction, absolute direction, and information of latitude;

calibrating, by the CPU, the circuitry based on:
   the stationary attitude measurement value that is a measurement value detected by the circuitry and information related to an arrangement of the circuitry in a stationary attitude, and
   the autorotation component of the sensor coordinate system with reference to the circuitry.

\* \* \* \* \*